(12) United States Patent
Ton-That et al.

(10) Patent No.: US 12,559,596 B2
(45) Date of Patent: Feb. 24, 2026

(54) LIGNIN PELLETS AND PROCESS FOR PRODUCING SAME

(71) Applicants: National Research Council of Canada, Ottawa (CA); Domtar Paper Company, LLC, Fort Mill, SC (US)

(72) Inventors: Minh Tan Ton-That, Montreal (CA); Hongbo Li, Laval (CA); Eric Patenaude, St-Jean-sur-Richelieu (CA); Bruno Marcoccia, Charlotte, NC (US); Shabnam Sanaei, Montreal (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 0 days.

(21) Appl. No.: 16/327,592

(22) PCT Filed: Aug. 23, 2017

(86) PCT No.: PCT/CA2017/000198
§ 371 (c)(1),
(2) Date: Feb. 22, 2019

(87) PCT Pub. No.: WO2018/035598
PCT Pub. Date: Mar. 1, 2018

(65) Prior Publication Data
US 2020/0131318 A1 Apr. 30, 2020

Related U.S. Application Data

(60) Provisional application No. 62/378,306, filed on Aug. 23, 2016.

(51) Int. Cl.
| | |
|---|---|
| *C08J 3/12* | (2006.01) |
| *C08J 3/20* | (2006.01) |
| *C08L 97/00* | (2006.01) |

(52) U.S. Cl.
CPC . *C08J 3/12* (2013.01); *C08J 3/20* (2013.01); *C08L 97/005* (2013.01); *C08J 2397/00* (2013.01)

(58) Field of Classification Search
CPC ......... B29K 2995/0056; C08J 2303/02; C07G 1/00; C08L 97/005
See application file for complete search history.

(56) References Cited

U.S. PATENT DOCUMENTS

| | | | |
|---|---|---|---|
| 8,383,784 B2 | 2/2013 | Park et al. | |
| 8,852,301 B1 * | 10/2014 | Bootsma .................. | C08H 6/00 44/577 |

(Continued)

FOREIGN PATENT DOCUMENTS

| | | |
|---|---|---|
| CN | 1766001 A | 5/2006 |
| CN | 101698749 A | 4/2010 |

(Continued)

OTHER PUBLICATIONS

Translation CN-101698749B (Year: 2011).*

(Continued)

*Primary Examiner* — Hoa (Holly) Le
(74) *Attorney, Agent, or Firm* — Lavery, de Billy, L.L.P.

(57) ABSTRACT

Lignin pellets comprising fused lignin are described herein. The lignin pellets may further comprise a processing aid, and/or a surfactant, and/or a chemical modifying agent, and/or a compatibilizer and/or a thermoplastic polymer. An extrusion process for producing the lignin pellets and their use in the manufacture of lignin thermoplastic blend products, polyols, polyphenols, polyaromatics and polyurethanes is also disclosed herein. The extruded lignin pellet may be dry-blended with additional thermoplastic and/or additive and then directly processed using processes such as injection molding, compression molding, extrusion, extrusion coat- (Continued)

(a)
(b)

ing, blowing, thermoforming, stamping, foaming, fiber drawing, calendering or rolling.

12 Claims, 7 Drawing Sheets

(56)                    References Cited

U.S. PATENT DOCUMENTS

| | | | |
|---|---|---|---|
| 2011/0296748 A1 | 12/2011 | Harris | |
| 2011/0302832 A1* | 12/2011 | Gronn | C10L 5/361 |
| | | | 44/589 |
| 2013/0154151 A1 | 6/2013 | Wang et al. | |
| 2013/0303667 A1 | 11/2013 | Cao et al. | |
| 2014/0076196 A1 | 3/2014 | Kawashima et al. | |
| 2014/0082998 A1 | 3/2014 | Brock et al. | |
| 2014/0121307 A1* | 5/2014 | Cao | C08L 51/06 |
| | | | 524/73 |
| 2015/0068112 A1 | 3/2015 | Varvemaa et al. | |
| 2016/0115281 A1 | 4/2016 | Lake et al. | |
| 2016/0184438 A1* | 6/2016 | Nelson | A61K 47/38 |
| | | | 536/56 |
| 2016/0208436 A1* | 7/2016 | Hiljanen | C07G 1/00 |
| 2016/0230099 A1* | 8/2016 | Hilli | C01B 32/336 |
| 2017/0101430 A1 | 4/2017 | Enqvist et al. | |

FOREIGN PATENT DOCUMENTS

| | | | | | |
|---|---|---|---|---|---|
| CN | 105838047 A | * | 8/2016 | | C08L 67/02 |
| CN | 106589871 A | | 4/2017 | | |
| CN | 106700442 A | | 5/2017 | | |
| CN | 106700444 A | | 5/2017 | | |
| DE | 102014004797 A1 | * | 11/2014 | | D01F 1/02 |
| EP | 3366723 A4 | | 10/2016 | | |
| JP | 11-501946 | | 2/1999 | | |
| JP | 11-152410 A | | 6/1999 | | |
| JP | 2000-517362 | | 12/2000 | | |
| JP | 2014-15579 A | | 1/2014 | | |
| JP | 2014077107 A | | 5/2014 | | |
| JP | 2015-533387 A | | 11/2015 | | |
| KR | 201108944 A | | 10/2011 | | |
| WO | 2014/070830 A1 | | 5/2014 | | |
| WO | 2014/122089 | | 8/2014 | | |
| WO | WO-2015138996 A1 | * | 9/2015 | | C08H 6/00 |

OTHER PUBLICATIONS

Translation CN-105838047-A (Year: 2016).*

Li et al., PLA-thermoplastic lignin blends, Plastic Engineering, Sep. 1, 2013 (Year: 2013).*

Translation DE-102014004797 A1 (Year: 2014).*

International Search Report issued in International Application No. PCT/CA2017/000198 dated Nov. 8, 2017, 4 pages.

Written Opinion issued in International Application No. PCT/CA2017/000198 dated Nov. 8, 2017, 5 pages.

Database WPI week 201674, Jul. 20, 2016, Thomson Scientific, London, GB; AN 2016-46213L XP002797820.

Database WPI week 201642, May 23, 2016 Thomson Scientific, London GB; AN 2016-332793 XP002797821.

Database WPI week 201181, Dec. 1, 2011 Thomson Scientific, London GB; AN 2011-P60728 XP002797822.

European Patent Office, Extended European Search Report, Mar. 6, 2020, 8 Pages.

Reynolds et al., Odor-Free Lignin from Lignocellulose by Means of High Pressure Unit Operations: Process Design, Assessment and Validation, Chem. Ing. Tech., 88, No. 10, 1513-1517, 2016.

* cited by examiner (a)

(b)

(a)

(b)

(a)

(b)

(c)

LIGNIN PELLETS AND PROCESS FOR PRODUCING SAME

CROSS-REFERENCE TO RELATED APPLICATIONS

This application is a national phase under 35 U.S.C. § 371 of International Application No. PCT/CA2017/000198, filed Aug. 23, 2017, which claims the benefit of priority to U.S. Provisional Patent Application Ser. No. 62/378,306, filed on Aug. 23, 2016. The contents of each of the referenced application are hereby incorporated by reference in their entirety.

FIELD

The present disclosure broadly relates to lignin pellets and a process for producing same. More specifically, but not exclusively, the present disclosure relates to lignin pellets comprising fused lignin. The present disclosure also relates to a process for producing the lignin pellets and their use in the manufacture of lignin thermoplastic blend products, polyols, polyphenols, polyaromatics and polyurethanes.

BACKGROUND

Lignin is a naturally occurring polymer that upon exposure to elevated temperatures undergoes thermal decomposition. Lignin is often found in the cell walls of vascular plants and in the woody stems of hardwoods and softwoods. Along with cellulose and hemicellulose, lignin forms the major components of the cell wall of these vascular plants and woods. Lignin acts as a binding material that binds the plant polysaccharides, microfibrils, and fibers, thereby imparting strength and rigidity to the plant stem. Depending on the biomass source, extraction process and conditions, lignin can be obtained in the form of a light to dark brown or reddish mass which may be granulated upon drying.

As one of the major components in the plant cell wall, lignin is the most abundant natural sources of aromatic compounds available on earth. Commercial lignins are obtained from the pulp and paper industry and the biorefining industry. The pulp and paper industry alone produces over 50 million tons of lignin annually which is mostly used as an energy source while not more than 2% is used for producing bio-dispersants for concrete admixtures, animal feed pellets, phenolic resins, polyurethane foams, dyestuff etc. Currently, lignin solubilized in black liquor at chemical pulp mills is converted to solid materials that may contain up to 85% lignin and then burned. Its high polydispersity index (PDI) and its relatively low chemical reactivity have been identified as some of the main reasons that have restricted a more significant valorization of commercial lignin into industrial products. Moreover, the high emission rate of volatile organic compounds (VOC) and the associated unfavorable odor characteristics have further prevented lignin materials from finding more widespread acceptance in a number of commercial applications. The VOC emissions of lignin typically contain, among others, phenol derivatives, aliphatic alcohols and aldehydes.

Thermoplastic materials are well known in the art. They are used in many applications, especially in forming articles that require shaping carried out under high temperatures and pressures. The processing of the thermoplastic materials generally involves injection molding, compression molding, extruding, extrusion coating, blowing, thermoforming, stamping, foaming, fiber drawing, calendering or rolling, etc.

A method for the production of pellets and briquettes, from lignin containing material, such as from raw materials of wood, bamboo, bagasse, straw, or grass has previously been described in U.S. patent application publication US2011/0302832. The method comprises passing the lignin containing material having a moisture content of less than about 30% by weight into a reactor; heating it to 180-235° C. by injecting superheated steam into the reactor; maintaining it in the reactor for a sufficient time to soften the material and release lignin; reducing the pressure in the reactor; and transforming the treated material to form pellets or briquettes using a briquette press.

U.S. Pat. No. 8,852,301 discloses pellets obtained from pre-treated and fermented biomass comprising at least 50% lignin by dry weight and from 40 to 75 weight percent moisture. Moreover, the pellets are disclosed as comprising an agent (i.e. additive or filler) that facilitates pelleting selected from the group consisting of ash, fiber, saw dust, distillers dried grains, or combinations thereof. The filler is disclosed as facilitating the further use (e.g. combustion) of the lignin pellets. Lignin containing samples having a moisture content of about 55% are disclosed as readily forming pellets using a drum pelletizer. The pellets can subsequently be further dried in ambient air, in ambient forced air or by flash drying, or a combination thereof. Final moisture contents ranging from approximately 8 to 20% can be obtained.

The present disclosure refers to a number of documents, the contents of which are herein incorporated by reference in their entirety.

SUMMARY

In an aspect, the present disclosure broadly relates to lignin pellets and a process for producing same. More specifically, but not exclusively, the present disclosure relates to lignin pellets comprising fused lignin. The present disclosure also relates to a process for producing the lignin pellets and their use in the manufacture of lignin thermoplastic blend products, polyols, polyphenols, polyaromatics and polyurethanes.

The present disclosure, in an aspect, relates to a lignin pellet comprising fused lignin. In an embodiment of the present disclosure, the lignin pellet comprises a moisture content of less than about 20%. In a further embodiment of the present disclosure, the lignin pellet comprises a moisture content of less than about 10%. In yet a further embodiment of the present disclosure, the lignin pellet comprises a moisture content of less than about 5%. In yet a further embodiment of the present disclosure, the lignin pellet comprises a moisture content of less than about 2%.

The present disclosure, in an aspect, relates to a lignin pellet comprising a fused lignin and an additive. In an embodiment of the present disclosure, the additive is at least one of a processing aid, a surfactant, a chemical modifying agent, a compatibilizer or a thermoplastic polymer. In a further embodiment of the present disclosure, the additive is a thermoplastic polymer. In a further embodiment of the present disclosure, the additive is a processing aid and a compatibilizer. In a further embodiment of the present disclosure, the additive is a processing aid, a compatibilizer and a thermoplastic polymer. In further embodiments of the present disclosure, the lignin pellet is used for the manufacture of lignin thermoplastic blends and/or for the manufacture of polyols, polyphenols, polyaromatics and polyurethanes. In yet a further embodiment of the present disclosure, the lignin pellet is used for dry-blending with a processing aid and/or a compatibilizer and/or a thermoplastic polymer. In yet a further embodiment of the present disclosure, the dry-blends are used in injection molding, compression molding, extrusion, extrusion coating, blowing, thermoforming, stamping, foaming, fiber drawing, calendering or rolling. In a further aspect of the present disclosure, the lignin pellet comprising a fused lignin is an extruded lignin pellet The present disclosure, in an aspect, relates to a lignin pellet comprising a fused lignin and an additive. In an embodiment of the present disclosure, the additive is a processing aid and/or a compatibilizer and/or a thermoplastic polymer. In a further embodiment of the present disclosure, the pellet comprises from about 1 wt. % to about 20 wt. % of the processing aid. In a further embodiment of the present disclosure, the pellet comprises from about 1 wt. % to about 20 wt. % of the compatibilizer. In a further embodiment of the present disclosure, the pellet comprises from about 5 wt. % to about 95 wt. % of the thermoplastic polymer. In further embodiments of the present disclosure, the lignin pellet is used for the manufacture of lignin thermoplastic blends and/or for the manufacture of polyols, polyphenols, polyaromatics and polyurethanes. In yet a further embodiment of the present disclosure, the thermoplastic blends are used in injection molding, compression molding, extruding, extrusion coating, blowing, thermoforming, stamping, foaming, fiber drawing, calendering or rolling. In yet a further embodiment of the present disclosure, the lignin pellet is used for dry-blending with a processing aid and/or a compatibilizer and/or a thermoplastic polymer.

The present disclosure, in an aspect, relates to a lignin pellet comprising a fused lignin and an additive. In an embodiment of the present disclosure, the additive is a processing aid. In a further embodiment of the present disclosure, the pellet comprises from about 1 wt. % to about 20 wt. % of the processing aid. In a further embodiment of the present disclosure, the processing aid is a plasticizer and/or a lubricant. In an aspect of the present disclosure, the plasticizer lowers the glass transition temperature of the lignin. In an embodiment of the present disclosure, the plasticizer is at least one of water, glycol, glycerol, crude glycerol, epoxidized soybean oil, poly(ethylene glycol) and poly(propylene glycol). In a further embodiment of the present disclosure, the poly(ethylene glycol) has an average molecular weight ranging between about 200 and about 8000 g/mol. In a further embodiment of the present disclosure, the lubricant is at least one of stearic acid, sodium stearate, calcium stearate and mineral oil.

The present disclosure, in an aspect, relates to a lignin pellet comprising a fused lignin and an additive. In an embodiment of the present disclosure, the additive is a processing aid and a compatibilizer. In a further embodiment of the present disclosure, the pellet comprises from about 1 wt. % to about 20 wt. % of the processing aid and from about 1 wt. % to about 20 wt. % of the compatibilizer. In a further embodiment of the present disclosure, the processing aid is a plasticizer and/or a lubricant. In an aspect of the present disclosure, the plasticizer lowers the glass transition temperature of the lignin powder. In an embodiment of the present disclosure, the plasticizer is at least one of water, glycol, glycerol, crude glycerol, epoxidized soybean oil, poly(ethylene glycol) and poly(propylene glycol). In a further embodiment of the present disclosure, the poly(ethylene glycol) has an average molecular weight ranging between about 200 and about 8000 g/mol. In a further embodiment of the present disclosure, the lubricant is at least one of stearic acid, sodium stearate and mineral oil. In a further embodiment of the present disclosure, the compatibilizer is at least one of a maleated polyethylene, a maleated polypropylene and a poly(ethylene-glycidyl methacrylate) copolymer. In further embodiments of the present disclosure, the maleated polyethylene is at least one of Fusabond® E226, Fusabond® E528, Fusabond® M603 and Epolene® C26; the maleated polypropylene is at least one of Epolene® E43, Epolene® 3015, Polybond® 3150, Polybond® 3200, Fusabond® MD353D, Fusabond® MD411D, Fusabond® MZ203D, Royaltuf® 485 and Royaltuf® 489; and the poly(ethylene-glycidyl methacrylate) copolymer is Lotader® 8840.

The present disclosure, in an aspect, relates to a lignin pellet comprising a fused lignin and an additive. In an embodiment of the present disclosure, the additive is a processing aid, a compatibilizer and a thermoplastic polymer. In a further embodiment of the present disclosure, the pellet comprises from about 1 wt. % to about 20 wt. % of the processing aid; from about 1 wt. % to about 20 wt. % of the compatibilizer; and from about 5 wt. % to about 95 wt. % of the thermoplastic polymer. In a further embodiment of the present disclosure, the processing aid is a plasticizer and/or a lubricant. In an aspect of the present disclosure, the plasticizer lowers the glass transition temperature of the lignin. In an embodiment of the present disclosure, the plasticizer is at least one of water, glycol, glycerol, epoxidized soybean oil, poly(ethylene glycol) and poly(propylene glycol). In a further embodiment of the present disclosure, the poly(ethylene glycol) has an average molecular weight ranging between about 200 and about 8000 g/mol. In a further embodiment of the present disclosure, the lubricant is at least one of stearic acid, sodium stearate and mineral oil. In a further embodiment of the present disclosure, the compatibilizer is at least one of a maleated polyethylene, a maleated polypropylene and a poly(ethylene-glycidyl methacrylate) copolymer. In further embodiments of the present disclosure, the maleated polyethylene is at least one of Fusabond® E226, Fusabond® E528, Fusabond® M603 and Epolene® C26; the maleated polypropylene is at least one of Epolene® E43, Epolene® 3015, Polybond® 3150, Polybond® 3200, Fusabond® MD353D, Fusabond® MD411D, Fusabond® MZ203D, Royaltuf® 485 and Royaltuf® 489; and the poly(ethylene-glycidyl methacrylate) copolymer is Lotader® 8840. In a further embodiment of the present disclosure, the thermoplastic polymer is at least one of polyethylene, polypropylene, poly(ethylene-propylene) copolymer, polyvinyl chloride, polystyrene, acrylonitrile butadiene styrene copolymer, poly(butylene succinate), polyhydroxyalkanoates, polyhydroxybutyrate, polybutyrate adipate terephthalate, thermoplastic starch and polylactide. In a further embodiment of the present disclosure, the polyethylene is at least one of low density polyethylene (LDPE), linear low density polyethylene (LLDPE) and high density polyethylene (HDPE).

The present disclosure, in an aspect, relates to a porous lignin pellet comprising a fused lignin and an additive. In an embodiment of the present disclosure, the porous lignin pellet has a density ranging between about 0.2 and about 1.1 g/cm³. In an embodiment of the present disclosure, the additive is a processing aid and/or a compatibilizer and/or a thermoplastic polymer. In a further embodiment of the present disclosure, the porous pellet comprises from about 1 wt. % to about 20 wt. % of the processing aid. In a further embodiment of the present disclosure, the porous extruded pellet comprises from about 1 wt. % to about 20 wt. % of the compatibilizer. In a further embodiment of the present disclosure, the porous extruded pellet comprises from about 5 wt. % to about 95 wt. % of the thermoplastic polymer. In a further aspect of the present disclosure, the porous lignin pellet is an extruded lignin pellet.

The present disclosure, in an aspect, relates to a non-porous extruded lignin pellet comprising a fused lignin and an additive. In an embodiment of the present disclosure, the additive is a processing aid and/or a compatibilizer and/or a thermoplastic polymer. In a further embodiment of the present disclosure, the non-porous extruded pellet comprises from about 1 wt. % to about 20 wt. % of the processing aid. In a further embodiment of the present disclosure, the non-porous extruded pellet comprises from about 1 wt. % to about 20 wt. % of the compatibilizer. In a further embodiment of the present disclosure, the non-porous extruded pellet comprises from about 5 wt. % to about 95 wt. % of the thermoplastic polymer. In a further aspect of the present disclosure, the non-porous lignin pellet is an extruded lignin pellet.

The present disclosure, in an aspect, relates to a lignin pellet comprising fused lignin comprising a VOC content of less than about 0.1%. In an embodiment of the present disclosure, the lignin pellet comprises a VOC content of less than about 0.04 wt. %. In an embodiment of the present disclosure, the lignin pellet comprises a VOC content of less than about 0.02 wt. %. In a further embodiment of the present disclosure, the lignin pellet comprises a VOC content of less than about 0.005 wt. %.

The present disclosure, in an aspect, relates to a lignin pellet comprising lignin powder comprising a VOC content of less than about 0.1%. In an embodiment of the present disclosure, the lignin pellet comprises a VOC content of less than about 0.04 wt. %. In an embodiment of the present disclosure, the lignin pellet comprises a VOC content of less than about 0.02 wt. %. In a further embodiment of the present disclosure, the lignin pellet comprises a VOC content of less than about 0.005 wt. %. In an embodiment of the present disclosure, the lignin pellet comprises a moisture content of less than about 20%. In a further embodiment of the present disclosure, the lignin pellet comprises a moisture content of less than about 10%. In yet a further embodiment of the present disclosure, the lignin pellet comprises a moisture content of less than about 5%. In yet a further embodiment of the present disclosure, the lignin pellet comprises a moisture content of less than about 2%.

The present disclosure, in an aspect, relates to a process for producing a lignin pellet, the process comprising:
feeding a lignin feed material into an extruder;
adding a processing aid to the lignin feed material at one or more downstream sections of the extruder to produce a mixture; and
devolatizing moisture and volatile organic content from the lignin feed material in the mixture.

In an embodiment of the present disclosure, the processing aid is added prior to or after devolatization. In an embodiment of the present disclosure, the process for producing a lignin pellet further comprises heating the lignin feed material and pelletizing. In a further embodiment of the present disclosure, the process for producing a lignin pellet further comprises adding one or more additives to the mixture. In a further embodiment of the present disclosure, the one or more additives are added during devolatization. In yet a further embodiment of the present disclosure, the process for producing a lignin pellet comprises adding a compatibilizer and/or a thermoplastic polymer after or before the devolatization. In yet a further embodiment of the present disclosure, the process for producing a lignin pellet comprises melting and blending a compatibilizer and/or a thermoplastic polymer with the lignin feed material. In an embodiment of the present disclosure, the extruded lignin pellet comprises fused lignin.

In an embodiment of the present disclosure, the extruded pellet comprises from about 1 wt. % to about 20 wt. % of the processing aid. In an embodiment of the present disclosure, the processing aid is a plasticizer and/or a lubricant. In an embodiment of the present disclosure, the plasticizer lowers the glass transition temperature of the lignin feed material. In a further embodiment of the present disclosure, the plasticizer is at least one of water, glycol, glycerol, epoxidized soybean oil, poly(ethylene glycol) and poly(propylene glycol). In yet a further embodiment of the present disclosure, the polyethylene glycol has an average molecular weight ranging between about 200 g/mol and about 8000 g/mol. In a further embodiment of the present disclosure, the lubricant is at least one of stearic acid, sodium stearate and mineral oil. In an embodiment of the present disclosure, the extruded pellet is a porous pellet. In an embodiment of the present disclosure, the extruded pellet is a non-porous pellet. In yet a further embodiment of the present disclosure, the extruded pellet comprises a fused lignin.

In an embodiment of the present disclosure, the extruded pellet comprises from about 1 wt. % to about 20 wt. % of the processing aid; from about 1 wt. % to about 20 wt. % of the compatibilizer; and from about 5 wt. % to about 95 wt. % of the thermoplastic polymer. In an embodiment of the present disclosure, the processing aid is a plasticizer and/or a lubricant. In an embodiment of the present disclosure, the plasticizer lowers the glass transition temperature of the lignin feed material. In a further embodiment of the present disclosure, the plasticizer is at least one of water, glycol, glycerol, epoxidized soybean oil, poly(ethylene glycol) and poly(propylene glycol). In yet a further embodiment of the present disclosure, the polyethylene glycol has an average molecular weight ranging between about 200 g/mol and about 8000 g/mol. In a further embodiment of the present disclosure, the lubricant is at least one of stearic acid, sodium stearate and mineral oil. In a further embodiment of the present disclosure, the compatibilizer is at least one of a maleated polyethylene, a maleated polypropylene and a poly(ethylene-glycidyl methacrylate) copolymer. In further embodiments of the present disclosure, the maleated polyethylene is at least one of Fusabond® E226, Fusabond® E528, Fusabond® M603 and Epolene® C26; the maleated polypropylene is at least one of Epolene® E43, Epolene® 3015, Polybond® 3150, Polybond® 3200, Fusabond® MD353D, Fusabond® MD411D, Fusabond® MZ203D, Royaltuf® 485 and Royaltuf® 489; and the poly(ethylene-glycidyl methacrylate) copolymer is Lotader® 8840. In a further embodiment of the present disclosure, the thermoplastic polymer is at least one of polyethylene, polypropylene, poly(ethylene-propylene) copolymer, polyvinyl chloride, polystyrene, acrylonitrile butadiene styrene copolymer, poly(butylene succinate) polyhydroxyalkanoates, polyhydroxybutyrate, polybutyrate adipate terephthalate, thermoplastic starch and polylactide. In a further embodiment of the present disclosure, the polyethylene is at least one of LDPE, LLDPE and HDPE. In an embodiment of the present disclosure, the extruded pellet is a porous pellet. In an embodiment of the present disclosure, the extruded pellet is a non-porous pellet. In yet a further embodiment of the present disclosure, the extruded pellet comprises a fused lignin and/or a processing aid and/or a compatibilizer and/or a thermoplastic polymer.

In an aspect of the present disclosure, the devolatization reduces both moisture and volatile organic content (VOC) from the extruded lignin pellet. In an embodiment of the present disclosure, the extruded lignin pellet comprises a VOC that has been reduced by at least about 40% relative to the VOC in the lignin feed material. In an embodiment of the present disclosure, the extruded lignin pellet comprises a VOC that has been reduced by at least about 60% relative to the VOC in the lignin feed material. In an embodiment of the present disclosure, the extruded lignin pellet comprises a VOC that has been reduced by at least about 80% relative to the VOC in the lignin feed material.

In an embodiment of the present disclosure, the lignin feed material comprises a moisture content ranging from about 1% to about 50%. In a further embodiment of the present disclosure, the lignin feed material has a moisture content ranging from about 1% to about 40%.

In an embodiment of the present disclosure, the extruded lignin pellet comprises a moisture content of less than about 20%. In a further embodiment of the present disclosure, the extruded lignin pellet comprises a moisture content of less than about 10%. In a further embodiment of the present disclosure, the extruded lignin pellet comprises a moisture content of less than about 5%. In yet a further embodiment of the present disclosure, the extruded lignin pellet comprises a moisture content of less than about 1%.

In an aspect of the present disclosure, in the absence of compatibilizer and thermoplastic polymer, the lignin pellets comprise a fused lignin wherein the lignin is melted and fused into a substantially single phase morphology. In an embodiment of the present disclosure, the single phase morphology of the lignin pellets is obtained by extrusion of a lignin feed material.

In an aspect of the present disclosure, in the presence of compatibilizer and/or thermoplastic polymer, the lignin pellets comprise a fused material wherein lignin and/or compatibilizer and/or thermoplastic polymer are melted and fused into a pellet having a substantially homogeneous phase morphology. In an embodiment of the present disclosure, the homogeneous phase morphology of the lignin pellets is obtained by extrusion of a lignin feed material with compatibilizer and/or thermoplastic polymer.

In an aspect, the present disclosure relates to the use of the extruded lignin pellets in applications, non-limiting examples of which include the manufacture of thermoplastic blend products, the manufacture of polyols, the manufacture of polyphenols, the manufacture of polyaromatics and the manufacture of polyurethanes. In an embodiment of the present disclosure, the extruded lignin pellets are used in thermoplastic applications, non-limiting examples include melt blending with a thermoplastic and/or an additive, followed by thermoplastic processing. In yet a further embodiment of the present disclosure, the extruded lignin pellets are processed into thermoplastic products without melt blending with a thermoplastic polymer. In such an embodiment, the extruded lignin pellet is dry-blended with additional thermoplastic and/or additive and then directly processed using processes such as injection molding, compression molding, extrusion, extrusion coating, blowing, thermoforming, stamping, foaming, fiber drawing, calendering or rolling.

Also disclosed in the context of the present disclosure are embodiments 1 to 25. Embodiment 1 is a lignin pellet comprising fused lignin. Embodiment 2 is the lignin pellet of embodiment 1, wherein the lignin pellet comprises a moisture content of less than about 5%. Embodiment 3 is the lignin pellet of embodiment 1 or 2, wherein the lignin pellet comprises a moisture content of less than about 2%. Embodiment 4 is the lignin pellet of any one embodiments 1 to 3, further comprising an additive. Embodiment 5 is the lignin pellet of embodiment 4, wherein the additive is at least one of a processing aid, a surfactant, a chemical modifying agent, a compatibilizer or a thermoplastic polymer. Embodiment 6 is the lignin pellet of embodiment 5, wherein the additive is a thermoplastic polymer. Embodiment 7 is the lignin pellet of embodiment 5, wherein the additive is a processing aid. Embodiment 8 is the lignin pellet of embodiment 5, wherein the additive is a processing aid and a compatibilizer. Embodiment 9 is the lignin pellet of embodiment 5, wherein the additive is a processing aid, a compatibilizer and a thermoplastic polymer. Embodiment 10 is the lignin pellet of any one of embodiments 1 to 9, wherein the pellet is an extruded lignin pellet. Embodiment 11 is the lignin pellet of any one of embodiments 1 to 10, wherein the pellet is a non-porous lignin pellet. Embodiment 12 is the lignin pellet of any one of embodiments 1 to 10, wherein the pellet is a porous lignin pellet. Embodiment 13 is the lignin pellet of any one of embodiments 1 to 12, wherein the pellet comprises a VOC content of less than about 0.1 wt. %. Embodiment 14 is the lignin pellet of any one of embodiments 1 to 13, further comprising at least one of starch, algae, mineral fillers, cellulosic materials or reinforcements. Embodiment 15 is the use of the lignin pellet of any one of embodiments 1 to 14 for the manufacture of lignin thermoplastic blends. Embodiment 16 is the use of the lignin pellet of any one of embodiments 1 to 14 for dry-blending with at least one of a processing aid, a compatibilizer and a thermoplastic polymer. Embodiment 17 is the use of the lignin pellet of embodiment 16, wherein the dry-blends are directly used in injection molding, compression molding, extrusion, extrusion coating, blowing, thermoforming, stamping, foaming, fiber drawing, calendering or rolling. Embodiment 18 is the use of the lignin pellet of any one of embodiments 1 to 14 for the manufacture of polyols, polyphenols, polyaromatics and polyurethanes.

Embodiment 19 is a process for producing a lignin pellet, the process comprising: feeding a lignin feed material into an extruder; adding a processing aid to the lignin feed material at one or more downstream sections of the extruder to produce a mixture; and devolatizing moisture and volatile organic content from the lignin feed material in the mixture. Embodiment 20 is the process of embodiment 19, further comprising adding one or more additives to the mixture during the devolatization. Embodiment 21 is the process of embodiment 19 or 20, wherein the lignin pellet comprises fused lignin. Embodiment 22 is the process of any one of embodiments 19 to 21, wherein the lignin pellet comprises a VOC that has been reduced by at least about 40% relative to the VOC in the lignin feed material.

Embodiment 23 is a lignin pellet comprising a lignin powder having a VOC content of less than about 0.1 wt. %. Embodiment 24 is the lignin pellet of embodiment 23, wherein the pellet comprises a moisture content of less than about 5%. Embodiment 25 is the lignin pellet of embodiment 23 or 24, further comprising an additive.

The foregoing and other advantages and features of the present disclosure will become more apparent upon reading of the following non-restrictive description of illustrative embodiments thereof, given by way of example only with reference to the accompanying drawings/figures.

BRIEF DESCRIPTION OF THE DRAWINGS/FIGURES

DETAILED DESCRIPTION

Glossary

Figure 1:
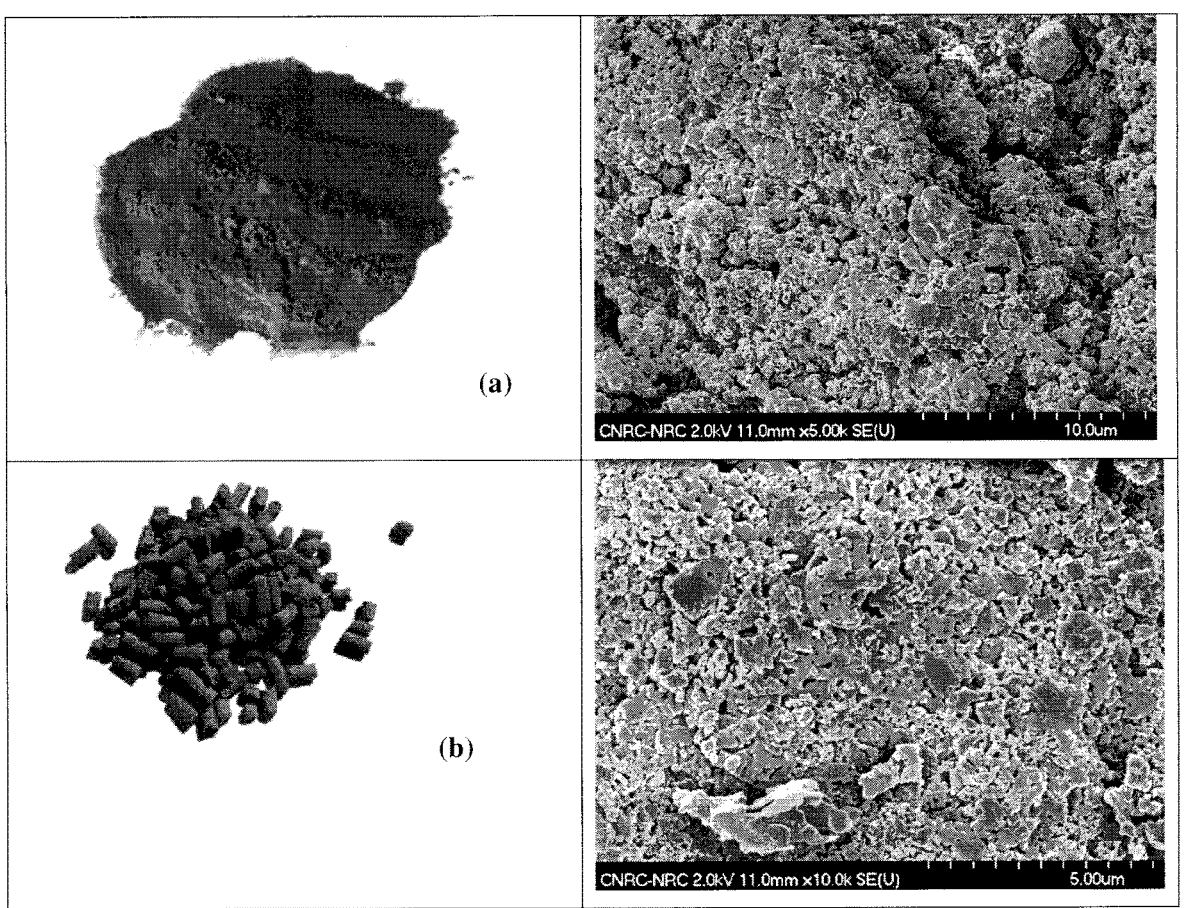
FIG. 1 illustrates photos and scanning electron micrograph (SEM) images of (a) raw wet lignin; (b) lignin pellets obtained using a conventional disk pelletizer after oven drying; and (c) fused lignin pellets in accordance with an embodiment of the present disclosure.
Figure 1:
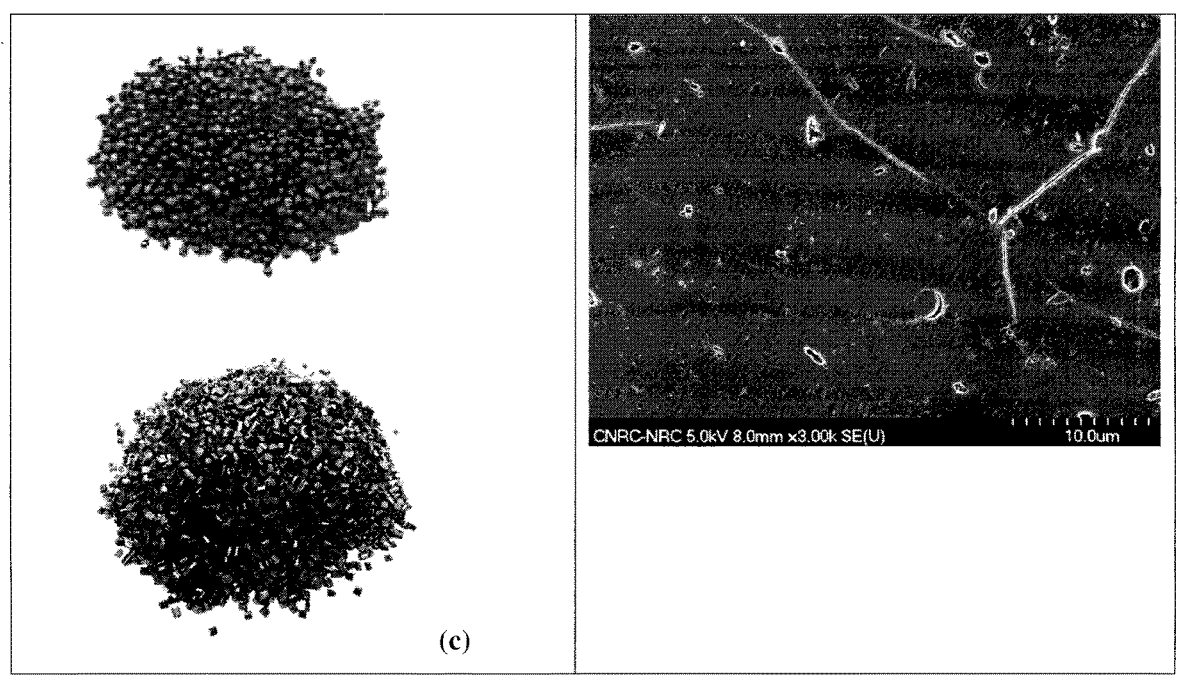
Figure 2:
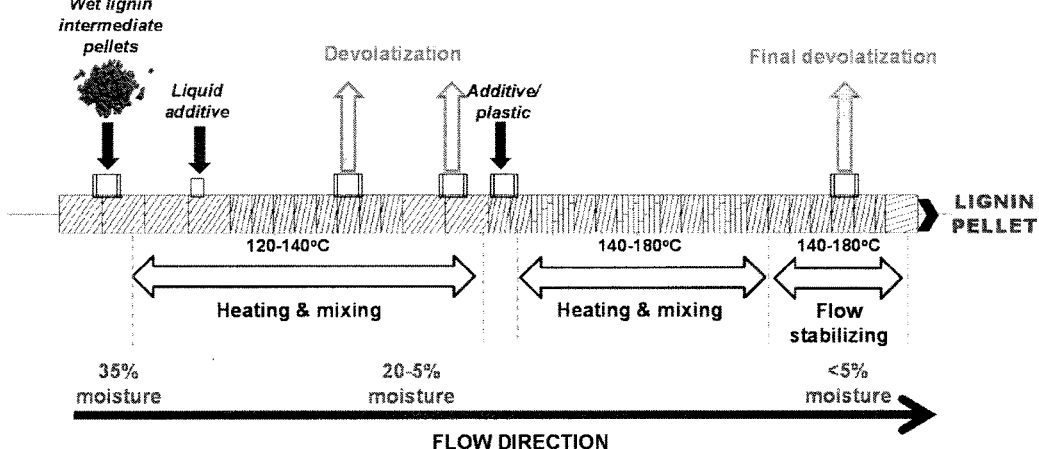
FIG. 2 illustrates a continuous process diagram comprising an extruder with various inlet and outlet ports in accordance with an embodiment of the present disclosure.

In order to provide a clear and consistent understanding of the terms used in the present disclosure, a number of definitions are provided below. Moreover, unless defined otherwise, all technical and scientific terms as used herein have the same meaning as commonly understood by one of ordinary skill in the art to which this disclosure pertains.

The word "a" or "an" when used in conjunction with the term "comprising" in the claims and/or the disclosure may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this disclosure and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this disclosure and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±1% of the modified term if this deviation would not negate the meaning of the word it modifies.

The term "thermoplastic polymer" as used within the context of the present disclosure, is meant to be broad and encompass any suitable polymer, composite, blend, material, etc. For example, the "thermoplastic polymer" may refer to polymers that are linear or branched in which chains are substantially not interconnected to one another. Thermoplastic polymers may be held together by non-covalent interactions, such as Hydrogen bonds and/or Van Der Waals forces as well as physical entanglements. Heating thermoplastic polymers breaks some of these non-covalent interactions between polymer chains and the polymer can be molded into a new shape. These thermoplastic polymers become pliable or moldable above their glass transition temperature (for amorphous thermoplastics) or melting temperature (for crystalline thermoplastics) and return to solid state upon cooling. Thermoplastic polymers are capable of being repeatedly shaped or molded with the application of heat and/or pressure.

The term "suitable" as used herein means that the selection of the particular compound or conditions would depend on the specific manipulation to be performed, and the identity of the molecule(s) to be transformed, but the selection would be well within the skill of a person trained in the art. All process/method steps described herein are to be conducted under conditions sufficient to provide the product shown. A person skilled in the art would understand that all processing conditions, including, for example, processing time, processing temperature, processing temperature, additive ratio and whether or not the process should be performed under an anhydrous or inert atmosphere, can be varied to optimize the yield or the performance of the desired product and it is within their skill to do so.

The term "extruder" as used herein, may be any device which is suitable for compounding a lignin feed material with one or more additives and may refer to any conventional single or twin screw extrusion device. Non-limiting examples of additives include UV-absorbers, light stabilizers, processing aids, antioxidants, heat stabilizers, impact modifiers, compatibilizers, plasticizers, lubricants, rheology modifiers, processing stabilizers, antistatic agents, slip agents, anti-block agents, coupling agents, dispersants, surface modifiers, thermoplastic polymers or mixtures of any of the foregoing additives. In an embodiment of the present disclosure, the additive is at least one of a processing aid, a compatibilizer and a thermoplastic polymer.

The term "lignin" as used herein, refers to a polymer found in woody plants, trees, and agricultural crops and residues. Commercial lignins are typically produced as a co-product of the pulp and paper industry, separated from trees by a chemical pulping process. However, any plant source (e.g., hard wood lignin, soft wood lignin, grass lignin, straw lignin, and bamboo lignin), nut source (e.g., pecan shell, walnut shell, peanut shell, etc. as a fine powder), seed source (e.g., cotton seed shell as a fine powder), and the like can be used to obtain lignins suitable for use in the compositions and methods of the present disclosure. Examples of lignins that can be obtained from plants, trees, and/or agricultural crops include, but are not limited to, Kraft lignins (from the Kraft pulping process), soda lignins (from soda pulping processes); lignin sulphonates (from sulfite pulping processes); organosolv lignins from solvent extraction; hydrolytic lignins (from biomass hydrolysis); lignins obtained from ethanol processes (via steam explosion, acid treatment, etc.); oxylignins; chlorolignins; protolignins; lignin black liquors obtained directly from the pulping process; derivatives thereof; and combinations thereof. Lignins obtained from the Kraft pulping process are generally not water-soluble. Sodium or potassium salts of lignins are generally water-soluble and may even be in liquid form.

The term "volatile organic compounds" (VOC) as used herein, refers to any organic (i.e. carbon-based) chemical compounds that have high enough vapor pressures under normal processing conditions, such as encountered in the processes of the present disclosure, to significantly vaporize and to enter the atmosphere. Accordingly, as used herein, it is not necessarily required that a particular VOC according to the present disclosure is fully vaporized under the environmental conditions employed and/or is only present in gaseous (volatile) form. Rather, at least part of a VOC according to the present disclosure may also be present in another aggregate state, for example in liquid form.

The term "reinforcements" as used herein, refers to any material capable of enhancing the mechanical properties of the lignin and/or lignin pellet and/or lignin thermoplastic blends and/or products produced therefrom. Non-limiting examples include synthetic or natural fibers, synthetic or natural particles and synthetic or natural nanoparticles.

In an aspect, the present disclosure relates to lignin pellets and a process for producing same. More specifically, but not exclusively, the present disclosure relates to lignin pellets comprising fused lignin. The present disclosure also relates to a process for producing the lignin pellets and their use in the manufacture of lignin thermoplastic blend products, polyols, polyphenols, polyaromatics and polyurethanes.

In an embodiment of the present disclosure, the lignin pellet comprising fused lignin comprises a moisture content of less than about 20%. In further embodiments of the present disclosure, the lignin pellet comprising a fused lignin comprises a moisture content of less than about 19%, of less than about 18%, of less than about 17%, of less than about 16%, of less than about 15%, of less than about 14%, of less than about 13%, of less than about 12%, of less than about 11%, of less than about 10%, of less than about 9%, of less than about 8%, of less than about 7%, of less than about 6%, of less than about 5%, of less than about 4%, of less than about 3%, of less than about 2% and of less than about 1%.

In an embodiment of the present disclosure, the lignin pellet comprising fused lignin further comprises an additive. Non-limiting examples of additives include processing aids, compatibilizers and thermoplastic polymers. Non-limiting examples of processing aids include plasticizers and lubricants. In a particular embodiment of the present disclosure, the lignin pellet comprising a fused lignin further comprises a processing aid. The processing aid may comprise from about 1 wt. % to about 20 wt. % of the lignin pellet, for example from about 1 wt. % to about 19 wt. % of the lignin pellet, for example from about 1 wt. % to about 18 wt. % of the lignin pellet, for example from about 1 wt. % to about 17 wt. % of the lignin pellet, for example from about 1 wt. % to about 16 wt. % of the lignin pellet, for example from about 1 wt. % to about 15 wt. % of the lignin pellet, for example from about 1 wt. % to about 14 wt. % of the lignin pellet, for example from about 1 wt. % to about 13 wt. % of the lignin pellet, for example from about 1 wt. % to about 12 wt. % of the lignin pellet, for example from about 1 wt. % to about 11 wt. % of the lignin pellet, for example from about 1 wt. % to about 10 wt. % of the lignin pellet, for example from about 1 wt. % to about 9 wt. % of the lignin pellet, for example from about 1 wt. % to about 8 wt. % of the lignin pellet, for example from about 1 wt. % to about 7 wt. % of the lignin pellet, for example from about 1 wt. % to about 6 wt. % of the lignin pellet, for example from about 1 wt. % to about 5 wt. % of the lignin pellet, for example from about 1 wt. % to about 4 wt. % of the lignin pellet, for example from about 1 wt. % to about 3 wt. % of the lignin pellet, for example from about 1 wt. % to about 2 wt. % of the lignin pellet or at any wt. % or any range derivable therein.

In an embodiment of the present disclosure, the lignin pellet comprising a fused lignin further comprises a plasticizer and/or a lubricant. Plasticizers increase the plasticity (flexibility) or fluidity of a material. In the context of the present disclosure, the plasticizer embeds itself between the chains of the lignin material spacing the chains apart, resulting in enhanced lignin chain mobility. In this manner, the free volume in the lignin material is increased and, as a result, the glass transition temperature of the lignin material decreases and the material becomes more fluid. Non-limiting examples of plasticizers include water, mineral and/or vegetable oils, abietates, adipates, alkyl sulfonates, azelates, benzoates, chlorinated paraffins, citrates, epoxides, glycol, glycerol, glycol ethers and their esters, poly(alkylene glycol), glutarates, ricinoleates, hydrocarbon oils, isobutyrates, oleates, pentaerythritol derivates, phosphates, phthalates, esters, sebacates, sulfonamides, tri- and pryromellitates, biphenyl derivates, stearates, difuran diesters, and fluorine-containing polymers. In the context of the present disclosure, a lubricant improves the flow characteristics of the lignin that is subjected to the extrusion process. While primarily acting as processing aids to reduce energy consumption and enhance the surface properties of the extruded material, they provide additional benefits such as improved anti-static properties. A lubricant may either act "internally" as friction modifiers to decrease melt viscosity or "externally" by coating or treating the metal surfaces of the processing equipment (i.e. extruder) thereby reducing the friction at the material-metal interface. Non-limiting examples of lubricants include stearic acid, metal ion comprising substances, such as stearic acid salts (stearates), fatty alcohols, fatty amides, fatty acid and glycerol esters, mineral oils, natural and synthetic waxes and fluoropolymers. Metal ions suitable for stearates can be, for example, but not limited to, zinc, calcium, magnesium, barium, sodium, potassium and aluminium.

The present disclosure also contemplates the use of a compatibilizing agent in formulating the lignin pellet comprising a fused lignin. In an embodiment of the present disclosure, the lignin pellet comprises a processing aid and a compatibilizer. In an aspect of the present disclosure, the compatibilizer improves the dispersion of the fused lignin in the thermoplastic polymer, improving the mechanical properties of the resulting lignin-thermoplastic blend pellet. In a further aspect of the present disclosure, the compatibilizer is a polyolefin, non-limiting examples of which include polyolefin-graft-maleic anhydride copolymers, a maleated polyethylene, a maleated polypropylene, a poly(ethylene-glycidyl methacrylate) copolymer and commercially available compatibilizing agents such as those sold under the tradenames Fusabond®, Epolene®, Polybond®, Royaltuf®, Lotader®, Exxelor® and Bondyram®.

In a particular embodiment of the present disclosure, the lignin pellet comprising a fused lignin comprises a compatibilizer. The compatibilizer may comprise from about 1 wt. % to about 20 wt. % of the lignin pellet, for example from about 1 wt. % to about 19 wt. % of the lignin pellet, for example from about 1 wt. % to about 18 wt. % of the lignin pellet, for example from about 1 wt. % to about 17 wt. % of the lignin pellet, for example from about 1 wt. % to about 16 wt. % of the lignin pellet, for example from about 1 wt. % to about 15 wt. % of the lignin pellet, for example from about 1 wt. % to about 14 wt. % of the lignin pellet, for example from about 1 wt. % to about 13 wt. % of the lignin pellet, for example from about 1 wt. % to about 12 wt. % of the lignin pellet, for example from about 1 wt. % to about 11 wt. % of the lignin pellet, for example from about 1 wt. % to about 10 wt. % of the lignin pellet, for example from about 1 wt. % to about 9 wt. % of the lignin pellet, for example from about 1 wt. % to about 8 wt. % of the lignin pellet, for example from about 1 wt. % to about 7 wt. % of the lignin pellet, for example from about 1 wt. % to about 6 wt. % of the lignin pellet, for example from about 1 wt. % to about 5 wt. % of the lignin pellet, for example from about 1 wt. % to about 4 wt. % of the lignin pellet, for example from about 1 wt. % to about 3 wt. % of the lignin pellet, for example from about 1 wt. % to about 2 wt. % of the lignin pellet or at any wt. % or any range derivable therein.

The present disclosure also contemplates the use of a thermoplastic polymer in formulating the lignin pellet comprising a fused lignin. In an embodiment of the present disclosure, the lignin pellet comprises a processing aid and/or a compatibilizer and/or a thermoplastic polymer. Non-limiting examples of thermoplastic polymers include bio-based polymers such as polylactide (PLA), poly(butylene succinate), polyhydroxyalkanoates, polyhydroxybutyrate, thermoplastic starch; polycarbonates, polyethylene terephthalate, polyolefins such as polyethylene, high density polyethylene, low density polyethylene, linear low density polyethylene, polypropylene, poly(ethylene-propylene) copolymer, polystyrene, polystyrene copolymers such as acrylonitrile-butadiene-styrene copolymer (ABS), styrene block copolymers, polyvinyl chloride (PVC), and recycled thermoplastics.

In a particular embodiment of the present disclosure, the lignin pellet comprising fused lignin comprises a thermoplastic polymer. The thermoplastic polymer may comprise from about 5 wt. % to about 95 wt. % of the lignin pellet, for example from about 5 wt. % to about 94 wt. % of the lignin pellet, for example from about 5 wt. % to about 93 wt.

% of the lignin pellet, for example from about 5 wt. % to about 92 wt. % of the lignin pellet, for example from about 5 wt. % to about 91 wt. % of the lignin pellet, for example from about 5 wt. % to about 90 wt. % of the lignin pellet, for example from about 5 wt. % to about 89 wt. % of the lignin pellet, for example from about 5 wt. % to about 88 wt. % of the lignin pellet, for example from about 5 wt. % to about 87 wt. % of the lignin pellet, for example from about 5 wt. % to about 86 wt. % of the lignin pellet, for example from about 5 wt. % to about 85 wt. % of the lignin pellet, for example from about 5 wt. % to about 84 wt. % of the lignin pellet, for example from about 5 wt. % to about 83 wt. % of the lignin pellet, for example from about 5 wt. % to about 82 wt. % of the lignin pellet, for example from about 5 wt. % to about 81 wt. % of the lignin pellet, for example from about 5 wt. % to about 80 wt. % of the lignin pellet, for example from about 5 wt. % to about 79 wt. % of the lignin pellet, for example from about 5 wt. % to about 78 wt. % of the lignin pellet, for example from about 5 wt. % to about 77 wt. % of the lignin pellet, for example from about 5 wt. % to about 76 wt. % of the lignin pellet, for example from about 5 wt. % to about 75 wt. % of the lignin pellet, for example from about 5 wt. % to about 74 wt. % of the lignin pellet, for example from about 5 wt. % to about 73 wt. % of the lignin pellet, for example from about 5 wt. % to about 72 wt. % of the lignin pellet, for example from about 5 wt. % to about 71 wt. % of the lignin pellet, for example from about 5 wt. % to about 70 wt. % of the lignin pellet, for example from about 5 wt. % to about 69 wt. % of the lignin pellet, for example from about 5 wt. % to about 68 wt. % of the lignin pellet, for example from about 5 wt. % to about 67 wt. % of the lignin pellet, for example from about 5 wt. % to about 66 wt. % of the lignin pellet, for example from about 5 wt. % to about 65 wt. % of the lignin pellet, for example from about 5 wt. % to about 64 wt. % of the lignin pellet, for example from about 5 wt. % to about 63 wt. % of the lignin pellet, for example from about 5 wt. % to about 62 wt. % of the lignin pellet, for example from about 5 wt. % to about 61 wt. % of the lignin pellet, for example from about 5 wt. % to about 60 wt. % of the lignin pellet, for example from about 5 wt. % to about 59 wt. % of the lignin pellet, for example from about 5 wt. % to about 58 wt. % of the lignin pellet, for example from about 5 wt. % to about 57 wt. % of the lignin pellet, for example from about 5 wt. % to about 56 wt. % of the lignin pellet, for example from about 5 wt. % to about 55 wt. % of the lignin pellet, for example from about 5 wt. % to about 54 wt. % of the lignin pellet, for example from about 5 wt. % to about 53 wt. % of the lignin pellet, for example from about 5 wt. % to about 52 wt. % of the lignin pellet, for example from about 5 wt. % to about 51 wt. % of the lignin pellet, for example from about 5 wt. % to about 50 wt. % of the lignin pellet, for example from about 5 wt. % to about 49 wt. % of the lignin pellet, for example from about 5 wt. % to about 48 wt. % of the lignin pellet, for example from about 5 wt. % to about 47 wt. % of the lignin pellet, for example from about 5 wt. % to about 46 wt. % of the lignin pellet, for example from about 5 wt. % to about 45 wt. % of the lignin pellet, for example from about 5 wt. % to about 44 wt. % of the lignin pellet, for example from about 5 wt. % to about 43 wt. % of the lignin pellet, for example from about 5 wt. % to about 42 wt. % of the lignin pellet, for example from about 5 wt. % to about 41 wt. % of the lignin pellet, for example from about 5 wt. % to about 40 wt. % of the lignin pellet, for example from about 5 wt. % to about 39 wt. % of the lignin pellet, for example from about 5 wt. % to about 38 wt. % of the lignin pellet, for example from about 5 wt. % to about 37 wt. % of the lignin pellet, for example from about 5 wt. % to about 36 wt. % of the lignin pellet, for example from about 5 wt. % to about 35 wt. % of the lignin pellet, for example from about 5 wt. % to about 34 wt. % of the lignin pellet, for example from about 5 wt. % to about 33 wt. % of the lignin pellet, for example from about 5 wt. % to about 32 wt. % of the lignin pellet, for example from about 5 wt. % to about 31 wt. % of the lignin pellet, for example from about 5 wt. % to about 30 wt. % of the lignin pellet, for example from about 5 wt. % to about 29 wt. % of the lignin pellet, for example from about 5 wt. % to about 28 wt. % of the lignin pellet, for example from about 5 wt. % to about 27 wt. % of the lignin pellet, for example from about 5 wt. % to about 26 wt. % of the lignin pellet, for example from about 5 wt. % to about 25 wt. % of the lignin pellet, for example from about 5 wt. % to about 24 wt. % of the lignin pellet, for example from about 5 wt. % to about 23 wt. % of the lignin pellet, for example from about 5 wt. % to about 22 wt. % of the lignin pellet, for example from about 5 wt. % to about 21 wt. % of the lignin pellet, for example from about 5 wt. % to about 20 wt. % of the lignin pellet, for example from about 5 wt. % to about 19 wt. % of the lignin pellet, for example from about 5 wt. % to about 18 wt. % of the lignin pellet, for example from about 5 wt. % to about 17 wt. % of the lignin pellet, for example from about 5 wt. % to about 16 wt. % of the lignin pellet, for example from about 5 wt. % to about 15 wt. % of the lignin pellet, for example from about 5 wt. % to about 14 wt. % of the lignin pellet, for example from about 5 wt. % to about 13 wt. % of the lignin pellet, for example from about 5 wt. % to about 12 wt. % of the lignin pellet, for example from about 5 wt. % to about 11 wt. % of the lignin pellet, for example from about 5 wt. % to about 10 wt. % of the lignin pellet, for example from about 5 wt. % to about 9 wt. % of the lignin pellet, for example from about 5 wt. % to about 8 wt. % of the lignin pellet, for example from about 5 wt. % to about 7 wt. % of the lignin pellet, for example from about 5 wt. % to about 6 wt. % of the lignin pellet or at any wt. % or any range derivable therein.

In a particular embodiment of the present disclosure, the lignin pellet comprising a fused lignin comprises a VOC that has been reduced by at least about 40% relative to the lignin feed material. In an embodiment of the present disclosure, the fused lignin comprises a VOC that has been reduced by at least about 60% relative to the lignin feed material. In an embodiment of the present disclosure, the fused lignin comprises a VOC that has been reduced by at least about 70% relative to the lignin feed material. In an embodiment of the present disclosure, the fused lignin comprises a VOC that has been reduced by at least about 80% relative to the lignin feed material. In further embodiments of the present disclosure, the fused lignin comprises a VOC that has been reduced, for example, by at least about 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79% or 80% relative to the lignin feed material, or any range derivable therein.

In an aspect, the present disclosure relates to an extrusion process for producing lignin pellets comprising a fused lignin. In an embodiment of the present disclosure, the extruded lignin pellet comprises a moisture content of less than about 20%. In further embodiments of the present disclosure, the lignin pellet comprising a fused lignin comprises a moisture content of less than about 19%, of less than about 18%, of less than about 17%, of less than about 16%, of less than about 15%, of less than about 14%, of less than about 13%, of less than about 12%, of less than about 11%, of less than about 10%, of less than about 9%, of less than about 8%, of less than about 7%, of less than about 6%, of less than about 5%, of less than about 4%, of less than about 3%, of less than about 2% and of less than about 1%.

In an embodiment of the present disclosure, a lignin feed material is fed into an extruder and is subsequently extruded with the aid of a processing aid. The lignin feed material may be in any suitable and processable form, such as in the form of a powder, chips, aggregates, granules, pellets or similar particles. In a further embodiment of the present disclosure, the lignin feed material comprises a moisture content ranging from about 1% to about 50%, for example from about 1 wt. % to about 49 wt. % of the lignin feed material, for example from about 1 wt. % to about 48 wt. % of the lignin feed material, for example from about 1 wt. % to about 47 wt. % of the lignin feed material, for example from about 1 wt. % to about 46 wt. % of the lignin feed material, for example from about 1 wt. % to about 45 wt. % of the lignin feed material, for example from about 1 wt. % to about 44 wt. % of the lignin feed material, for example from about 1 wt. % to about 43 wt. % of the lignin feed material, for example from about 1 wt. % to about 42 wt. % of the lignin feed material, for example from about 1 wt. % to about 41 wt. % of the lignin feed material, for example from about 1 wt. % to about 40 wt. % of the lignin feed material, for example from about 1 wt. % to about 39 wt. % of the lignin feed material, for example from about 1 wt. % to about 38 wt. % of the lignin feed material, for example from about 1 wt. % to about 37 wt. % of the lignin feed material, for example from about 1 wt. % to about 36 wt. % of the lignin feed material, for example from about 1 wt. % to about 35 wt. % of the lignin feed material, for example from about 1 wt. % to about 34 wt. % of the lignin feed material, for example from about 1 wt. % to about 33 wt. % of the lignin feed material, for example from about 1 wt. % to about 32 wt. % of the lignin feed material, for example from about 1 wt. % to about 31 wt. % of the lignin feed material, for example from about 1 wt. % to about 30 wt. % of the lignin feed material, for example from about 1 wt. % to about 29 wt. % of the lignin feed material, for example from about 1 wt. % to about 28 wt. % of the lignin feed material, for example from about 1 wt. % to about 27 wt. % of the lignin feed material, for example from about 1 wt. % to about 26 wt. % of the lignin feed material, for example from about 1 wt. % to about 25 wt. % of the lignin feed material, for example from about 1 wt. % to about 24 wt. % of the lignin feed material, for example from about 1 wt. % to about 23 wt. % of the lignin feed material, for example from about 1 wt. % to about 22 wt. % of the lignin feed material, for example from about 1 wt. % to about 21 wt. % of the lignin feed material, for example from about 1 wt. % to about 20 wt. % of the lignin feed material, for example from about 1 wt. % to about 19 wt. % of the lignin feed material, for example from about 1 wt. % to about 18 wt. % of the lignin feed material, for example from about 1 wt. % to about 17 wt. % of the lignin feed material, for example from about 1 wt. % to about 16 wt. % of the lignin feed material, for example from about 1 wt. % to about 15 wt. % of the lignin feed material, for example from about 1 wt. % to about 14 wt. % of the lignin feed material, for example from about 1 wt. % to about 13 wt. % of the lignin feed material, for example from about 1 wt. % to about 12 wt. % of the lignin feed material, for example from about 1 wt. % to about 11 wt. % of the lignin feed material, for example from about 1 wt. % to about 10 wt. % of the lignin feed material, for example from about 1 wt. % to about 9 wt. % of the lignin feed material, for example from about 1 wt. % to about 8 wt. % of the lignin feed material, for example from about 1 wt. % to about 7 wt. % of the lignin feed material, for example from about 1 wt. % to about 6 wt. % of the lignin feed material, for example from about 1 wt. % to about 5 wt. % of the lignin feed material, for example from about 1 wt. % to about 4 wt. % of the lignin feed material, for example from about 1 wt. % to about 3 wt. % of the lignin feed material, for example from about 1 wt. % to about 2 wt. % of the lignin feed material, or at any wt. % or any range derivable therein. In yet a further embodiment of the present disclosure, the lignin feed material may be pre-dried to a relative moisture content of less than about 40% by weight, or less than about 30% by weight, or less than about 20% by weight, or less than about 10% by weight.

In an aspect of the present disclosure, the extruder comprises one or more feed ports through which one or more materials may be added to the lignin feed material. In a further aspect, the extruder may further comprise one or more devolatization ports (vents). The temperature in the extruder is typically in the range of about 120° C. to about 230° C. In an embodiment of the present disclosure, the extruder comprises a heating zone, a devolatization zone, an optional mixing zone for adding compatibilizer or thermoplastic or both and a flow stabilizing zone. The heating and devolatization zones are typically maintained at a temperature ranging from about 120° C. to about 150° C., or at a temperature ranging from about 121° C. to about 149° C., or at a temperature ranging from about 122° C. to about 148° C., or at a temperature ranging from about 123° C. to about 147° C., or at a temperature ranging from about 124° C. to about 146° C., or at a temperature ranging from about 125° C. to about 145° C., or at a temperature ranging from about 126° C. to about 144° C., or at a temperature ranging from about 127° C. to about 143° C., or at a temperature ranging from about 128° C. to about 142° C., or at a temperature ranging from about 129° C. to about 141° C., or at a temperature ranging from about 130° C. to about 140° C., or at a temperature ranging from about 131° C. to about 139° C., or at a temperature ranging from about 132° C. to about 138° C., or at a temperature ranging from about 133° C. to about 137° C., or at a temperature ranging from about 134° C. to about 136° C., or any range derivable therein. The mixing zone is typically maintained at a temperature ranging from about 140° C. to about 230° C., depending on the type and concentration of compatibilizer or thermoplastic or both. The flow stabilizing zone is typically maintained at a temperature ranging from about 120° C. to about 230° C., depending on the type and concentration of compatibilizer or thermoplastic or both as well as other additives and fillers that may be present. In an embodiment of the present disclosure, the extruder is provided with a cooling apparatus such as circulating water to regulate the temperature of the barrel(s). In a further embodiment, the temperature is independently controlled at the various zones of the extruder. In yet a further embodiment of the present disclosure, the heating zone, the devolatization zone, the mixing zone and/or the flow stabilizing zone operate under a temperature window.

In an aspect of the present disclosure, the extruder is a twin-screw extruder. In an embodiment of the present disclosure, the twin-screw extruder has a length/diameter ratio of at least about 20. In a further embodiment of the present disclosure, the screw configuration is designed to accommodate the operating requirements for producing a lignin pellet, e.g. feeding lignin feed material and a processing aid and/or a compatibilizer and/or a thermoplastic polymer; heating; devolatizing moisture and VOCs; blending and flow stabilizing. In yet a further embodiment of the present disclosure, the processing temperature along the extruder and the resident time of the material in the extruder are optimized to maximize devolatization of moisture and VOCs and/or blending while minimizing thermal degradation of lignin. In a particular embodiment of the present disclosure, the resident time is less than about 5 minutes. In yet a further particular embodiment of the present disclosure, multiple vents may be positioned along the extruder to facilitate devolatization of moisture and VOCs. A person skilled in the art would understand that vacuum vents can also be used and it is within their skill to do so.

In an aspect of the present disclosure, the processing parameters (e.g. temperature profile, mixing intensity, etc.) are controlled to keep a certain amount of moisture in the lignin material in order to produce a porous lignin pellet when the lignin material exits the extruder at atmospheric pressure. In an embodiment of the present disclosure, post extrusion processing, such as oven drying, cyclone drying, fluidized bed drying, flash drying, belt drying, etc., can be used to further remove the moisture content from the lignin pellet.

The screw(s) of the extruder provide the mechanical force necessary to force the heated material through the extruder barrel and subsequently out through the die. The extruder screw(s) generally include a number of elements arranged along its length. These elements can be selected from forwarding screw elements, mixing elements such as kneading disc block elements, and other special mixing elements that can be used to enhance distributive and dispersive mixing. During operation, the forwarding screw elements serve to drag or push the material through the extruder barrel(s) towards and through the die. The mixing elements such as kneading disc block elements are used for kneading and mixing. The extrudate is subsequently cut into pellets. Such pelletization techniques are generally known. In an embodiment of the present disclosure the pelletization is achieved, but not limited to any conventional pelletizer attached to the extruder, such die-face cutter, underwater pelletizer, air-dried pelletizer, water-cooled pelletizer, etc.

The extruder screw(s) may additionally contain reversing elements or non-pumping barrier elements located at one or more points along its length. The reverse elements are sometimes referred to as "left-hand" elements while non-pumping barrier elements include, for example, neutral kneading disc block elements or blister rings. Elements of these types produce localized forces on the polymer mixture in the upstream direction, i.e. in the direction opposite of the mass flow of materials through the extruder barrel(s). These elements in some cases provide mixing within the extruder barrel, and can serve to control the flow of materials through the barrel. It is often preferable to include one or more reversing elements or non-pumping barrier elements upstream of one or more of the vent(s) and preferably upstream of each vent other than a back vent; reversing elements or non-pumping barrier elements upstream of a vent can force the material to fully fill the barrel upstream of the vent, forming a "melt seal" which prevents volatilized materials from traveling up stream through the barrel. In this way, gasses are forced downstream from the melt seal to the next downstream vent, from which they escape from the extruder barrel. The reversing elements or non-pumping barrier elements preferably are designed so that relatively low pressures are produced in the extruder barrel. A person skilled in the art would understand that the sequence of all the extruder screw elements can be varied and it is within their skill to do so.

In an aspect of the present disclosure, the extrusion process is a continuous process. The extrusion process is typically conducted at temperatures sufficient to melt the lignin feed material and/or thermoplastic polymer with the addition of one or more additives by means of injection or side-feeders located downstream from the lignin-feed intake port. "Upstream" refers to the direction opposite of that of the flow of materials through the extruder barrel; "downstream" refers to the direction of the flow of materials, i.e., in the direction of the outlet (i.e. the dye) from which the material is discharged. In an embodiment of the present disclosure, the extruded pellets are subsequently molded into thermoplastic articles. Such molding techniques are well known to those skilled in the art of thermoplastics polymer engineering. Without undue experimentation, but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (Elsevier), one can make articles of any conceivable shape and appearance using lignin pellets of the present disclosure.

In an embodiment of the present disclosure, the extruded lignin pellets can be used to produce lignin/thermoplastic polymer blends which are suitable for injection molding, compression molding, extruding, extrusion coating, blowing, thermoforming, stamping, foaming, fiber drawing, calendering or rolling. In a particular embodiment of the present disclosure, the lignin/thermoplastic polymer blend is a blend of lignin with at least one of the following thermoplastics: polyethylene, polypropylene, poly(ethylene-propylene) copolymer, polyvinyl chloride, polystyrene, acrylonitrile butadiene styrene copolymer, poly(butylene succinate), polyhydroxyalkanoates, polyhydroxybutyrate, thermoplastic starch and polylactide.

EXPERIMENTAL

A number of examples are provided herein below illustrating the preparation of lignin pellets and/or blends in accordance with various non-limiting illustrative embodiments of the present disclosure.

Example 1: Fused Lignins Prepared by Batch Internal Mixer

Materials: BioChoice® lignin powders having moisture contents of 0, 18 and 35% were used. The formulation details are given in Table 1.

Fused Lignin Preparation: The mixture of lignin powder and PEG 8000, and lignin powder and Struktol® TW012 were premixed before feeding into a Brabender Plasti-Corder® mixer for the melt blending. When starch was used, the starch powder and the glycerol are premixed to get a starch paste saturated with glycerol. These pastes were then dry mixed with lignin powder before feeding into the Brabender mixer. The dry mixture was then fed into the Brabender for melting and blending. The rotary speed for the blending was set at 50 rpm. The processing time was fixed at about 5 min. The minimum processing temperatures for lignin without moisture was 150° C., while lignins with moisture could be processed as low as at 120° C.

During the mixing process, the lignin was homogenized and formed a fused structure with the aid of moisture, plasticizers and the added lubricant. The moisture was evaporated at the end of the mixing. The fused lignin products were cooled down to room temperature and collected at the end of the processing. The presence of moisture in the lignin and the addition of the plasticizer and lubricant significantly improved the lignin processing to yield a homogeneous fused structure and reduced the processing temperature avoiding thermal degradation of lignin.

TABLE 1

| | | | Formulation details for Example 1 | | | | |
|---|---|---|---|---|---|---|---|
| Sample ID | Lignin (g) | Moisture in Lignin (wt. %) | Plasticizer | Plasticizer (g) | Starch (g) | Struktol ® (g) | Minimum Processing Temperature (° C.) |
| 1 | 56 | 35 | PEG8000 | 14 | | | 120 |
| 2 | 63 | 35 | PEG8000 | 7 | | | 120 |
| 3 | 66.5 | 35 | PEG8000 | 3.5 | | | 120 |
| 4* | 66.5 | 0 | PEG8000 | 3.5 | | | 150 |
| 5 | 66.5 | 35 | | | | 3.5 | 150 |
| 6 | 56 | 35 | Glycerol | 8.96 | 5.04 | | 120 |
| 7 | 63 | 35 | Glycerol | 4.48 | 2.52 | | 120 |
| 8 | 66.5 | 35 | Glycerol | | 1.26 | | 120 |
| 9* | 56 | 0 | Glycerol | 8.96 | 5.04 | | 120 |
| 10 | 56 | 18 | Glycerol | 8.96 | 5.04 | | 120 |
| 11 | 63 | 18 | Glycerol | 4.48 | 2.52 | | 120 |
| 12 | 63 | 18 | PEG8000 | 7 | | | 120 |

*not very homogeneous

Example 2: Fused Lignin Pellets Made from Different Dried Lignin Powders

Materials: BioChoice® lignin powder was dried to a moisture content of less than 2 wt % prior to use. The formulation details are given in Table 2. The mixture of lignin powder and PEG 8000, and of lignin powder and Struktol® TW012 were premixed before feeding into a twin-screw extruder.

Fused Lignin Pellet Preparation: A Buehler twin-screw extruder BTSK 20/40D was utilized in the processing. The raw materials for each formulation were fed separately into the extruder at the upstream feeding section of the extruder using the TSE feeders. The first few zones were used for the conveying and heating of the lignin powder with the additives. Kneading blocks were located at the downstream sections of the extruder for better melting and mixing the lignin powder with the additives. The lignin melt exiting the die was cut into spherical pellets using a die face cutter, air cooled and collected. The feeding rate was set at 2 kg/hr. The screw speed was set at 150-200 rpm. The processing temperature was set at 120-140° C. for the conveying section, and 150-180° C. for the mixing section (lignin mixing and lignin fusion).

TABLE 2

| Sample ID | Lignin Source | Moisture in Lignin (wt. %) | Lignin Content in Fused pellet (wt. %) | PEG8000 Content in Fused Pellet (wt. %) | Lubricant | Lubricant Content in Fused Pellet (wt %) |
|---|---|---|---|---|---|---|
| | | Formulation details for Example 2. | | | | |
| 13 | BioChoice ® | 0 | 98 | 2 | | |
| 14 | BioChoice ® | 0 | 95 | 5 | | |
| 15 | BioChoice ® | 0 | 96 | 2 | Sodium stearate | 2 |
| 16 | BioChoice ® | 0 | 96 | 2 | Sodium stearate | 2 |
| 17 | BioChoice ® | 0 | 93 | 5 | Struktol ® | 2 |
| 18 | Protobind ® | 0 | 98 | 2 | | |
| 19 | Protobind ® | 0 | 96 | 2 | Sodium stearate | 2 |
| 20 | Protobind ® | 0 | 93 | 5 | Sodium stearate | 2 |
| 21 | Indulin AT | 0 | 98 | 2 | | |
| 22 | Indulin AT | 0 | 96 | 2 | Sodium stearate | 2 |
| 23 | Indulin AT | 0 | 93 | 5 | Sodium stearate | 2 |

Example 3: Fused Lignin Pellets (Porous and Non-Porous) Made from Wet Lignin Powder Materials: BioChoice® lignin powder having a moisture content of 18% was used. The formulation details are given in Table 3.

Fused Lignin Pellet Preparation: A Buehler twin-screw extruder BTSK 20/40D was utilized in the processing. The raw materials for each formulation were fed separately into the extruder at the feeding section of the extruder using the TSE feeders. The first few zones were used for the conveying and heating of the lignin with the additives. In the middle and end sections of the TSE were located two venting ports to remove moisture from the lignin mixture. Kneading blocks were located at the downstream sections of the extruder for better melting and mixing the lignin powder with the additives. The lignin melt exiting the die was cut into spherical pellets using a die face cutter, air cooled and collected. The feeding rate was set at 2 kg/hr. The screw speed was set at 150-200 rpm. The processing temperature was set at 120-140° C. for the conveying and venting sections, and 150-180° C. for the mixing sections (downstream sections; lignin mixing and fusion).

The venting was controlled to obtained lignin pellets having a moisture content of 0-5 wt %. To produce the porous pellets, it is necessary to have moisture in the molten lignin prior to exiting the extruder. The porosity, porous structure and sizes of the lignin pellets were controlled by the die face cutting speed, the cooling speed of the cut pellets, the moisture level in the pellets, as well as the die pressure and die temperature.

TABLE 3

| Sample ID | Lignin Content in Fused Pellet (wt. %) | PEG8000 Content in Fused Pellet (wt. %) | Lubricant | Lubricant Content in Fused Pellet (wt. %) |
|---|---|---|---|---|
| | | Formulation details for Example 3. | | |
| 24 | 98 | 2 | | |
| 25 | 95 | 5 | | |

TABLE 3-continued

| Sample ID | Lignin Content in Fused Pellet (wt. %) | PEG8000 Content in Fused Pellet (wt. %) | Lubricant | Lubricant Content in Fused Pellet (wt. %) |
|---|---|---|---|---|
| | | Formulation details for Example 3. | | |
| 26 | 96 | 2 | Sodium stearate | 2 |
| 27 | 96 | 2 | Sodium stearate | 2 |
| 28 | 93 | 5 | Struktol ® | 2 |

Example 4: Fused Lignin Pellets Made from Different Dry Lignin Powders and Glycerol Contents Materials: BioChoice® lignin powder, Protobind® 1000 lignin powder, Indulin AT lignin powder, FPI lignin powder, Struktol® TW012 (lubricant) and glycerol (plasticizer). The formulation details are given in Table 4.

Figure 3:
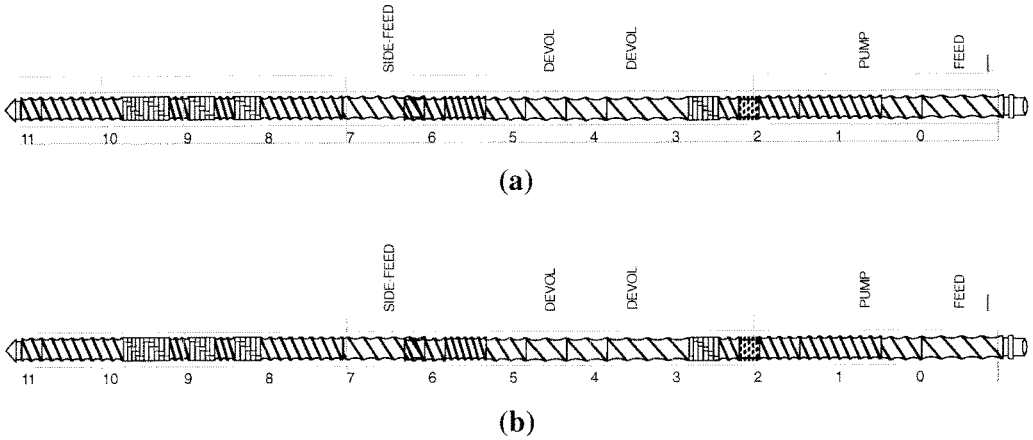
FIG. 3 illustrates a screw design for a twin-screw extruder: (a) without and (b) with a feeding port, in accordance with an embodiment of the present disclosure.
Figure 4:
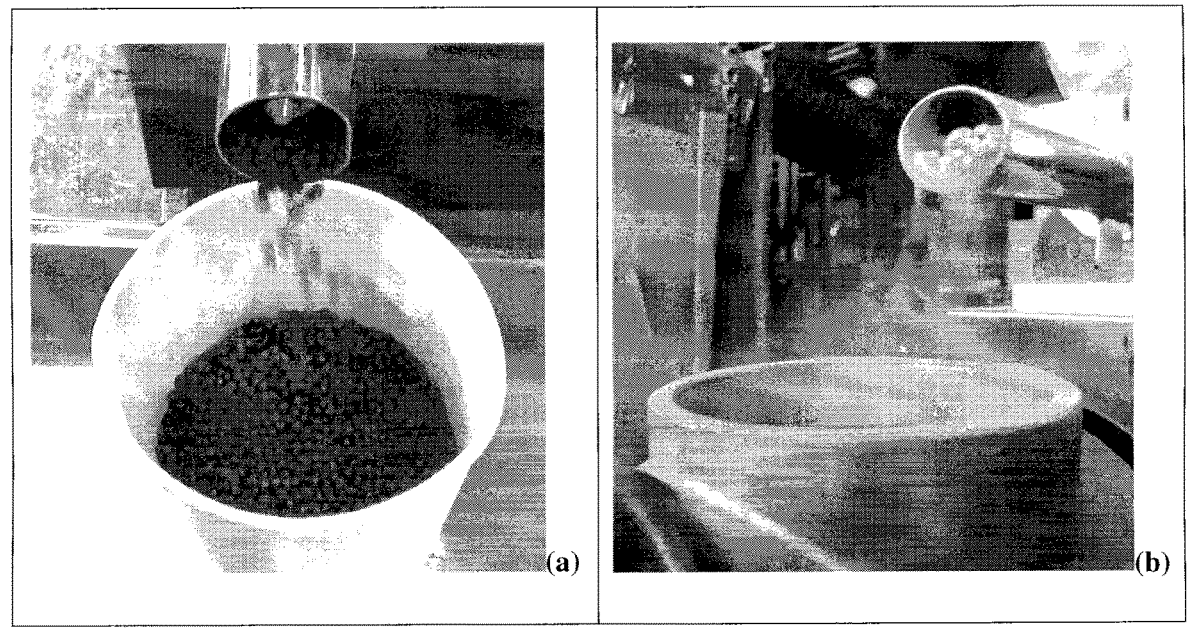
FIG. 4 illustrates the flowability and cohesive strength of (a) extruded fused lignin pellets prepared in accordance with an embodiment of the present disclosure; and (b) conventional lignin pellets prepared using a disk pelletizer.
Figure 5:
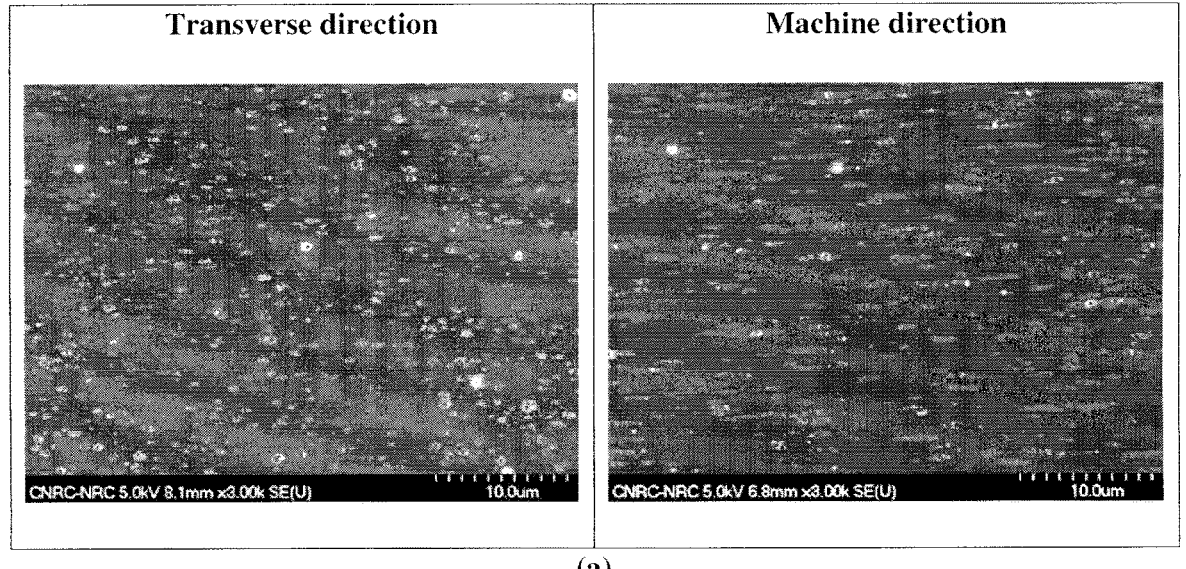
FIG. 5 illustrates various scanning electron micrograph (SEM) images illustrating the lignin dispersion in various fused blends of lignin with: (a) LDPE in film; (b) PP in injected part; and (c) PLA (20% lignin) in accordance with an embodiment of the present disclosure.
Figure 5:
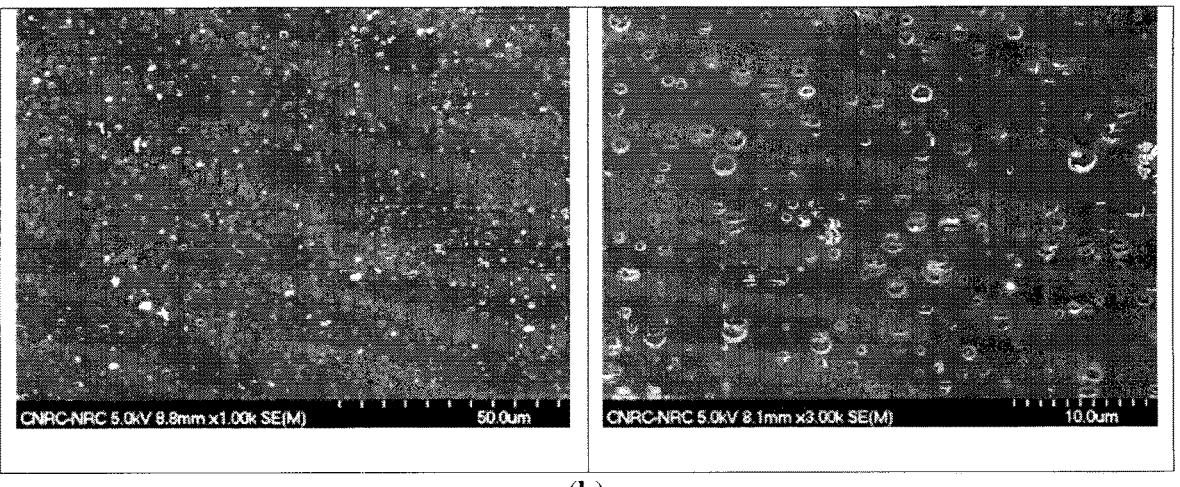
Figure 5:
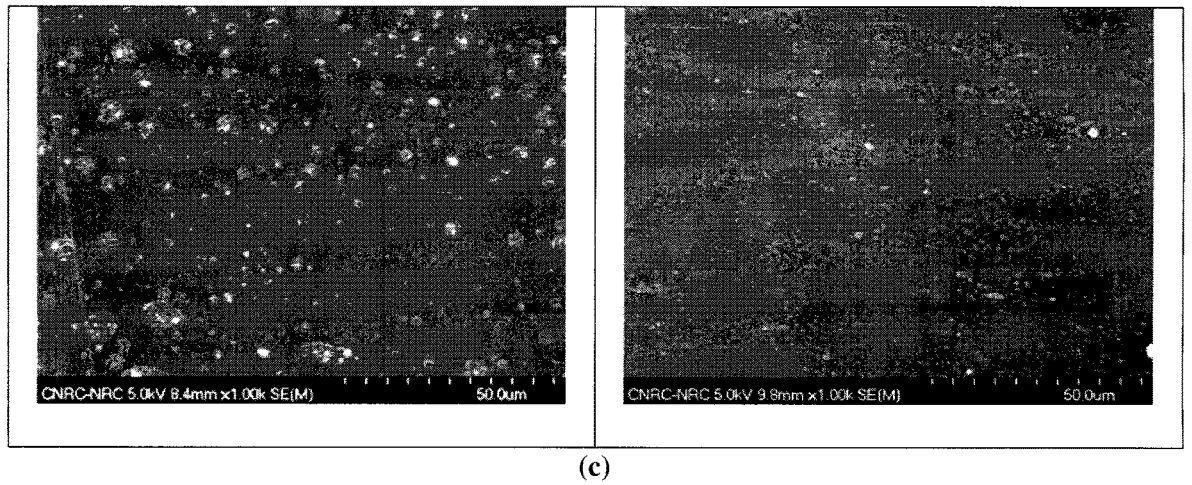
Figure 6:
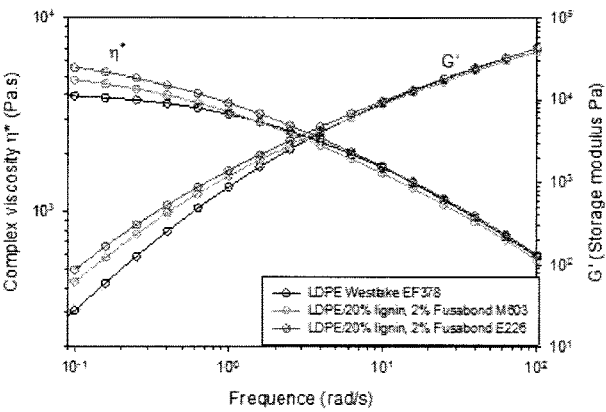
FIG. 6 illustrates rheology curves for LDPE and various fused lignin-LDPE blends (20% lignin+2% Fusabond® M603; and 20% lignin+2% Fusabond® E226) at different shear rates The fused lignin-LDPE blends preserve the LDPE rheology properties in the shear rate zone associated with plastic processing.
Figure 7:
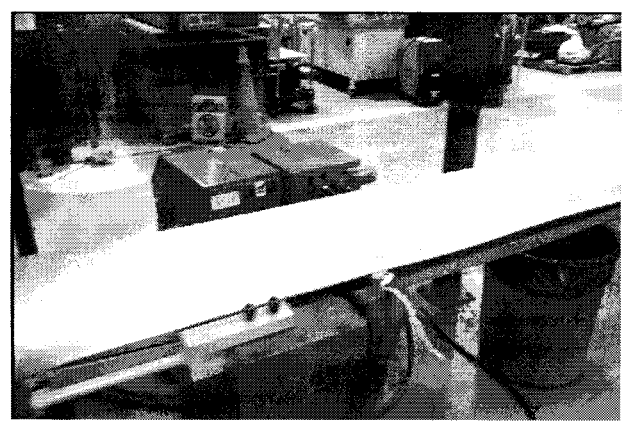
FIG. 7 illustrates a photo and scanning electron micrograph (SEM) image of a PS/lignin foam containing 20 wt % lignin and its morphology, in accordance with an embodiment of the present disclosure.
Figure 7:
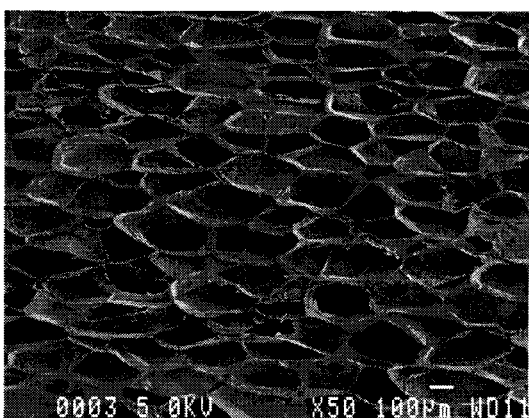
Figure 8:
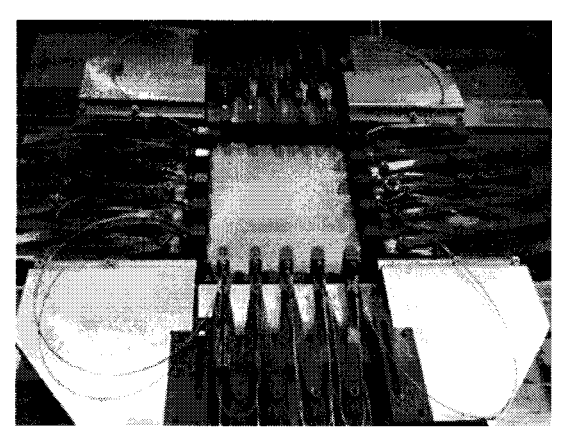
FIG. 8 illustrates a photo of a PLA/lignin biaxial stretched film containing 20-30 wt % lignin, in accordance with an embodiment of the present disclosure.
Figure 8:
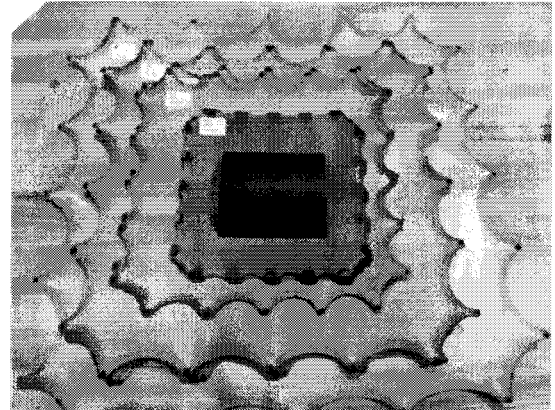
Figure 9:
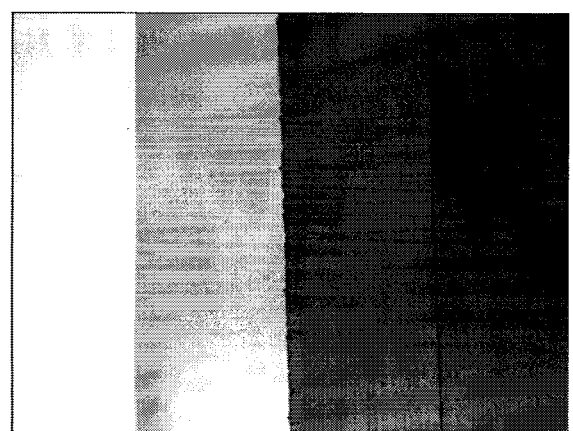
FIG. 9 illustrates a photo of a PVC/lignin extruded sheet containing 0, 5, 10 and 20 wt % lignin (from left to right), in accordance with an embodiment of the present disclosure.
Figure 10:
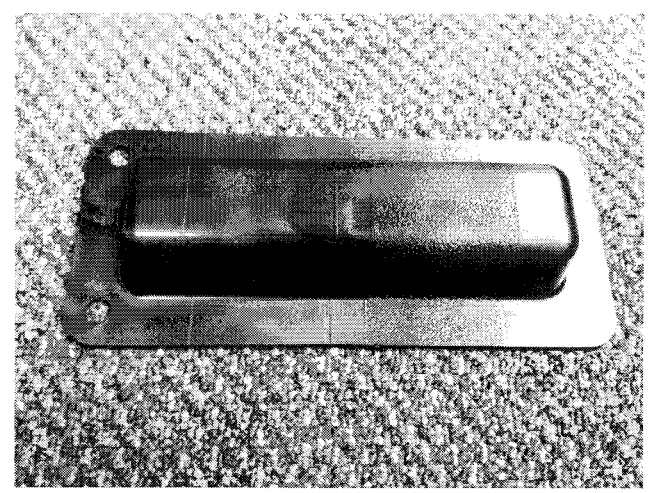
FIG. 10 illustrates a photo of a PP/lignin injected part containing 20 wt % lignin, in accordance with an embodiment of the present disclosure.

Fused Lignin Pellet Preparation: A Leistritz twin-screw extruder (D=34 mm, L/D=42) was utilized in the processing. The raw materials for each formulation were fed separately into the extruder at the feeding sections of the extruder using the TSE feeders. The liquid additive was fed through an injection port at the end of the feeding sections of the extruder using a liquid pump. The first few zones were used for the conveying and heating of the lignin with the additives. Kneading blocks were located at the downstream sections of the extruder for better melting and mixing the lignin powder with the additives. The lignin melt exiting the die was air cooled and pelletized into fused lignin pellets using a conventional pelletizer. The total production rate of the lignin pellets was set at up to 10 kg/hr. The screw speed was set at 150-200 rpm. The processing temperature was set at 120-140° C. for the conveying sections, and 150-180° C. for the mixing sections (downstream sections; lignin mixing and fusion). An image of the screw as used is illustrated in FIG. 3b.

TABLE 4

| Sample ID | Lignin Source | Lignin Content in Fused Pellet (wt. %) | Glycerol Content in Fused Pellet (wt. %) | Struktol ® TW012 Content in Fused Pellet (wt. %) |
|---|---|---|---|---|
| | | Formulation details for Example 4. | | |
| 29 | BioChoice ® | 95 | 5 | |
| 30 | BioChoice ® | 90 | 10 | |
| 31 | BioChoice ® | 85 | 15 | |
| 32 | BioChoice ® | 80 | 20 | |
| 33 | BioChoice ® | 88 | 10 | 2 |
| 34 | Protobind ® | 90 | 10 | |
| 35 | Indulin AT | 90 | 10 | |
| 36 | FPI | 90 | 10 | |

Example 5: Fused Lignin Pellets Made from Wet Lignin Powders and Different Glycerol Contents Materials: BioChoice® lignin powder (35% moisture content), Struktol® TW012 (lubricant) and glycerol (plasticizer). The formulation details are given in Table 5.

Fused Lignin Pellet Preparation: A Leistritz twin-screw extruder (D=34 mm, L/D=42) was utilized in the processing.

In the middle and end sections of the TSE were located two venting ports to remove moisture from the lignin mixture. The venting was by means of atmospheric vents. The second venting can be a vacuum vent to increase moisture removal if needed. An option of further venting could be installed at the end of the extrusion zone to remove residual moisture if necessary. The raw materials for each formulation were fed separately into the extruder at the feeding sections of the extruder using the TSE feeders. The liquid additive was fed through an injection port at the end of the feeding sections of the extruder using a liquid pump. The injection port could optionally be positioned further downstream, after the first and second venting ports, so as to not disrupt the moisture removal.

The first few zones were used for the conveying and heating of the lignin with the additives and to remove moisture from the lignin mixture. Kneading blocks were located at the downstream sections of the extruder for better melting and mixing the lignin powder with the additives. The lignin melt exiting the die was air cooled and pelletized into fused lignin pellets using a conventional pelletizer. The total production rate of the lignin pellets was set at up to 10 kg/hr. The screw speed was set at 150-200 rpm. The processing temperature was set at 120-140° C. for the conveying sections, and 150-180° C. for the mixing sections (downstream sections; lignin mixing and fusion). An image of the screw as used is illustrated in FIG. 3a.

TABLE 5

Formulation details for Example 5.

| Sample ID | Lignin Source | Lignin Content in Fused Pellet (wt. %) | Glycerol Content in Fused Pellet (wt. %) | Struktol ® TW012 Content in Fused Pellet (wt. %) |
|---|---|---|---|---|
| 37 | BioChoice ® | 95 | 5 | |
| 38 | BioChoice ® | 90 | 10 | |
| 39 | BioChoice ® | 85 | 15 | |
| 40 | BioChoice ® | 80 | 20 | |
| 41 | BioChoice ® | 88 | 10 | 2 |
| 42 | BioChoice ® | 90 | 10 | |

Example 6: Fused Lignin Pellets Made from Wet Lignin Intermediate Pellets and Different Plasticizer Contents Materials: BioChoice® lignin powder (35% moisture content), Struktol® TW012 (lubricant), Epoxidized Soybean Oil CP Cizer B-22 (ESO) (plasticizer) and glycerol (plasticizer). The formulation details are given in Table 6. Wet lignin intermediate pellets were prepared by mechanical compression of BioChoice® lignin powder (35% moisture content) using a conventional pelletizer. The resulting intermediate pellets were not fused. Instead, the individual lignin particles were observed to stick loosely together. The moisture content in the intermediate pellets was 35%.

Fused Lignin Pellet Preparation: The fused lignin was prepared as described hereinabove for Example 5, except that lignin intermediate pellets were used instead of lignin powder. Similar non-porous and porous fused lignin pellets were obtained for all types of lignin powder in Example 5.

TABLE 6

Formulation details for Example 6.

| Sample ID | Lignin Source | Lignin Content in Fused Pellet (wt. %) | Plasticizer | Plasticizer Content in Fused Pellet (wt. %) | Struktol ® TW012 Content in Fused Pellet (wt. %) |
|---|---|---|---|---|---|
| 43 | BioChoice ® | 95 | Glycerol | 5 | |
| 44 | BioChoice ® | 90 | Glycerol | 10 | |
| 45 | BioChoice ® | 85 | Glycerol | 15 | |
| 46 | BioChoice ® | 80 | Glycerol | 20 | |
| 47 | BioChoice ® | 88 | Glycerol | 10 | 2 |
| 48 | BioChoice ® | 90 | ESO | 10 | |

Example 7: Fused Lignin Pellets Made from Wet Lignin Intermediate Pellets and Different Glycerol Contents and Compatibilizers Materials: BioChoice® lignin powder (35% moisture content), Struktol® TW012 (lubricant), glycerol (plasticizer), Fusabond® E226 (E226), Fusabond® E528 (E528), Fusabond® M603 (M603), Epolene® C26 (C26), Lotader® AX8840 (8840), Polybond® 3009 (P3009), Epolene® E43, Fusabond® P353 (P353) and Resalloy 109. The formulation details are given in Table 7. The compatibilizers improve the compatibility of obtained fused lignin pellets with various polymers (PE, PP, PVC, PS, PLA, etc.).

Fused Lignin Pellet Preparation: The equipment, screw configuration and experimental set-up were very similar to the one as described hereinabove for Example 6 except for the presence of a side-feeding port for feeding the compatibilizer(s). Kneading blocks were located at the downstream sections of the extruder for better melting and mixing the compatibilizer(s) with the lignin. The total production rate of the lignin pellets was set at 10 kg/hr. The screw speed was set at 150-200 rpm. The processing temperature was set at 120-140° C. for the conveying sections, and 150-180° C. for the mixing sections (downstream sections; lignin mixing and fusion). Similar non-porous and porous fused lignin pellets were obtained for all types of lignin powder in Example 6. An image of the screw as used is illustrated in FIG. 3b.

TABLE 7

Formulation details for Example 7.

| Sample ID | Lignin Content* (wt. %) | Glycerol Content* (wt. %) | Struktol ® TW012 Content* (wt %) | Compatibilizer | Compatibilizer Content in Fused Pellet (wt. %) |
|---|---|---|---|---|---|
| 49 | 90 | 10 | | E226 | 10 |
| 50 | 90 | 10 | | E528 | 10 |
| 51 | 90 | 10 | | M603 | 10 |
| 52 | 90 | 10 | | C26 | 10 |
| 53 | 90 | 10 | | 8840 | 10 |
| 54 | 90 | 10 | | 8840/M603 | 5/5 |
| 55 | 85 | 15 | | 8840 | 10 |
| 56 | 88 | 10 | 2 | 8840 | 10 |
| 57 | 90 | 10 | | 3009 | 10 |
| 58 | 90 | 10 | | E43 | 10 |
| 59 | 90 | 10 | | P353 | 10 |
| 60 | 90 | 10 | | Resalloy 109 | 10 |

*Based on the dried mass of lignin plus the mass of glycerol and Struktol ®

Example 8: Fused Lignin Pellets Made from Wet Lignin Intermediate Pellets, Glycerol, Compatibilizers and Polymers Materials: BioChoice® lignin powder (35% moisture content), glycerol (plasticizer), Fusabond® M603 (M603), Lotader® AX8840 (8840), Epolene® E43, Fusabond® P353 (P353), Resalloy 109, Novapol® LF-Y819-A (LDPE Nova), Westlake EF378 (LDPE Westlake), Dowlex® 2045 (LLDPE Dow), Pro-fax 6323 (PP6323), PS HH103 and Pro-fax 6323 (PP6323). The weight ratio between lignin (in dried content) and glycerol was kept at 9:1. The formulation details are given in Table 8.

Fused Lignin Pellet Preparation: The equipment, screw configuration and experimental set-up were very similar to the one as described hereinabove for Example 7 except for the presence of a side-feeding port for feeding the compatibilizer(s) and polymer, as well as the presence of additional kneading blocks for improved melting and mixing. Similar non-porous and porous fused lignin pellets were obtained for all types of lignin powder in Example 6.

TABLE 8

Formulation details for Example 8.

| Sample ID | Lignin and Glycerol Content in Fused Pellet (wt. %) | Polymer | Polymer Content in Fused Pellet (wt. %) | Compatibilizer | Compatibilizer in Fused Pellet (wt. %) |
|---|---|---|---|---|---|
| 61 | 90 | LDPE Nova | 30 | M603 | 10 |
| 62 | 90 | LDPE Nova | 30 | 8840 | 10 |
| 63 | 90 | LDPE Nova | 30 | M603/ 8840 | 5/5 |
| 64 | 90 | LDPE Westlake | 30 | 8840 | 10 |
| 65 | 90 | LLDPE Dowlex | 30 | 8840 | 10 |
| 66 | 90 | LDPE Nova | 40 | 8840 | 10 |
| 67 | 90 | PP6323 | 40 | E43 | 10 |
| 68 | 90 | PP6323 | 40 | P353 | 10 |
| 69 | 90 | PS HH103 | 40 | Resalloy 129 | 10 |
| 70 | 90 | PLA4032D | 40 | | |
| 71 | 90 | PP6323 | 40 | PLA4032D | 10 |

Example 9: Volatile Organic Compounds (VOC) Removal During Lignin Pellet Processing Volatile organic compounds were removed, together with vaporized moisture, condensed and collected. The VOC content was evaluated for sample ID 38 (Example 5). The condensate was analyzed using Thermogravimetric Analysis (TGA), Gas Chromatography (GC), Mass Spectroscopy (MS) and High Pressure Liquid Chromatography (HPLC). This evaluation suggested that the VOC content in the fused lignin pellets was reduced by more than 80% relative to the VOC content in the lignin starting material.

Example 10: Lignin-Polyol from Dry Lignin Powder and Different Plasticizers

Materials: BioChoice® lignin powder, Protobind® 1000 lignin powder, Indulin AT lignin powder, FPI lignin powder, Carbowax™ (PEG400), Poly(propylene glycol) 700 (PPG700), Ethylene glycol (EG), Diethylene glycol (DEG).

A Leistritz twin-screw extruder (D=34 mm, L/D=42) was utilized in the processing. The formulation details are given in Table 9.

Figure 11:
FIG. 11 is a photo of a rigid PU foam manufactured in accordance with an embodiment of the present disclosure.

The equipment, screw configuration and experimental set-up were very similar to the one as described hereinabove for Example 4. The products could be readily solubilized in various commercial polyols and phenol. The products can be used for the manufacture of polyurethane (PU) and phenol-formaldehyde based products (FIG. 11).

TABLE 9

Formulation details for Example 10.

| Sample ID | Lignin | Moisture in Lignin (wt. %) | Lignin (wt. %) | Plasticizer | Plasticizer (wt. %) |
|---|---|---|---|---|---|
| 72 | BioChoice ® | 0 | 20 | PEG400 | 80 |
| 73 | BioChoice ® | 0 | 30 | PEG400 | 70 |
| 74 | BioChoice ® | 0 | 40 | PEG400 | 60 |
| 75 | BioChoice ® | 0 | 50 | PEG400 | 50 |
| 76 | Indulin AT | 0 | 20 | PEG400 | 80 |
| 77 | Indulin AT | 0 | 30 | PEG400 | 70 |
| 78 | Indulin AT | 0 | 40 | PEG400 | 60 |
| 79 | Indulin AT | 0 | 50 | PEG400 | 50 |
| 80 | FPI lignin | 0 | 20 | PEG400 | 80 |
| 81 | Protobind ® | 0 | 20 | PEG400 | 80 |
| 82 | FPI lignin | 0 | 20 | PEG400 | 80 |
| 83 | BioChoice ® | 0 | 20 | PPG700 | 80 |
| 84 | BioChoice ® | 0 | 20 | EG | 80 |
| 85 | BioChoice ® | 0 | 20 | DEG | 80 |
| 86 | BioChoice ® | 0 | 20 | PG | 80 |

Example 11: LDPE/Lignin Blends from Fused Lignin Pellets

The fused lignin pellets from samples 13-57 and 61-66 were used to produce LDPE/lignin blends by melt compounding with LDPE using a Leistritz twin-screw extruder (D=34 mm, L/D=42) at 180-200° C. The feeding rate was set at 10 kg/hr. The lignin content in the final blends was varied between 10 and 50 wt %. All the blends can be readily extruded. The extruded threads appear very uniform and homogeneous. If desired, additional additives such as a compatibilizer, pigment, anti-UV agent, flame retardant, etc. or other polymer can be added. The formulation details are given in Table 10. The blends are suitable, for example, for injection molding and film blowing applications.

TABLE 10

Formulation details for Example 11.

| Sample ID | Fused Lignin Pellet ID | Compatibilizer | Compatibilizer Content in Final Blend (wt. %) | Lignin Content In Final Blend (wt. %) |
|---|---|---|---|---|
| 87 | 44 | 8840 | 2% | 20% |
| 88 | 53 | 8840 | 2% | 20% |
| 89 | 51 | M603 | 2% | 20% |
| 90 | 63 | 8840 | 2% | 20% |
| 91 | 62 | 8840 | 3% | 30% |
| 92 | 62 | 8840 | 2% | 20% |
| 93 | 65 | 8840 | 2% | 20% |
| 94 | 78 | 8840 | 2% | 20% |

Example 12: PP/Lignin Blends from Fused Lignin Pellets

The fused lignin pellets from sample 44 were used to produce PP/lignin blends by melt compounding with PP6323 using a Leistritz twin-screw extruder (D=34 mm, L/D-42). The experimental set-up was very similar to the one as described hereinabove for Example 11. The formulation details are given in Table 11. The blends are suitable, for example, for injection molding, sheet extrusion, thermoforming and biaxial oriented film applications.

TABLE 11

Formulation details for Example 12.

| Sample ID | Fused Lignin Pellet ID | Compatibilizer | Compatibilizer Content in Final Blend (wt. %) | Lignin Content In Final Blend (wt. %) |
|---|---|---|---|---|
| 95 | 44 | E43 | 2% | 20% |
| 96 | 44 | E43 | 3% | 30% |
| 97 | 44 | E43 | 3% | 40% |

Example 13: Lignin Blends with PS, PLA and HDPE from Fused Lignin Pellets

The fused lignin pellets from sample 44 were blended with PS, PLA and HDPE by melt compounding using a Leistritz twin-screw extruder (D=34 mm, L/D=42). The experimental set-up was very similar to the one as described hereinabove for Example 12. The formulation details are given in Table 12. The blends are suitable, for example, for injection molding, sheet extrusion, thermoforming, physical foaming, and biaxial oriented film applications.

TABLE 12

Formulation details for Example 13.

| Sample ID | Fused Lignin Pellet ID | Polymer | Lignin Content In Final Blend (wt. %) |
|---|---|---|---|
| 98 | 44 | PS | 20% |
| 99 | 44 | PLA | 20% |
| 100 | 44 | HDPE | 20% |

Example 14: Film Blowing Applications Using Fused Lignin Pellets

Films were blown from LDPE Nova (Novapol® LF-Y819-A) and LDPE/lignin blends prepared in Example 11. The film tensile properties are given in Table 13. The results indicate that the strength at yield and modulus of the LDPE/lignin films are superior to those of the reference LDPE film. Similarly, the tear resistance of the blends is superior to those of the reference LDPE film.

TABLE 13

Tensile properties of the LDPE/lignin films.

| Film ID | Blend ID | Thick-ness (mm) | Strength at Yield (MPa) MD | TD | Modulus (MPa) MD | TD | Elongation at Break (%) MD | TD |
|---|---|---|---|---|---|---|---|---|
| F-LDPE Nova | | 50 | 8.6 (0.4) | 8.7 (0.2) | 166 (5) | 179 (6) | 398 (86) | 637 (70) |
| F1 | 92 | 40 | 11.3 (0.5) | 10.4 (0.5) | 374 (54) | 285 (25) | 159 (50) | 341 (106) |
| F2 | 89 | 50 | 11.2 (0.5) | 9.9 (0.2) | 286 (14) | 258 (50) | 180 (28) | 379 (98) |

TABLE 13-continued

Tensile properties of the LDPE/lignin films.

| Film ID | Blend ID | Thick-ness (mm) | Strength at Yield (MPa) MD | TD | Modulus (MPa) MD | TD | Elongation at Break (%) MD | TD |
|---|---|---|---|---|---|---|---|---|
| F3 | 88 | 52 | 10.3 (0.3) | 9.7 (0.4) | 448 (28) | 259 (54) | 170 (50) | 128 (114) |
| F4 | 87 | 45 | 10.3 (1.0) | 10.1 (0.6) | 223 (38) | 215 (25) | 209 (46) | 170 (118) |

MD and TD are machine direction and transverse direction, respectively.

Example 15: Injection Molding Applications Using Fused Lignin Pellets

Pro-fax 6323 (PP6323) and PP/lignin (Sample ID 96) were molded into a dog-bone sample using a Boy injection molding machine. A fused lignin pellet (Sample ID 44) was mixed with a compatibilizer (Epolene® E43) and Pro-fax 6323 (PP6323) to yield a mixture having a lignin content of 30 wt. %. The mixture was dry-blended and molded into dog-bone samples using a Boy injection molding machine. No melt compounding was performed. The tensile properties were subsequently determined (Table 14).

The results indicate that the blends' tensile strength is very similar to that of PP6323. However, the modulus of the blends increased significantly relative to PP6323. Furthermore, a significant reduction in the elongation at break was observed for the blends. This reduction, however, is quite common when blending a rigid polymer (e.g. lignin) with a softer one (PP). It was also observed that the properties of the blends prepared by dry-blending (without melt-compounding) are quite similar to those of blends prepared by melt-compounding. This indicates that it is indeed possible to eliminate the melt compounding step when using the fused lignin pellets of the present disclosure for injection applications (reducing processing costs).

TABLE 14

Tensile properties of the PP/lignin injected samples.

| Injected Sample ID | Blend ID/ Pellet ID | Maximum Strength (MPa) | Young Modulus (MPa) | Elongation at Break (%) |
|---|---|---|---|---|
| I-PP6323 | | 29.1 (0.2) | 1536 (21) | 924 (1) |
| I1 | 96 (compounding) | 31.6 (0.4) | 1947 (18) | 121 (28) |
| I2 | 44 (No melt compounding) | 27.8 (0.4) | 1918 (50) | 55 (27) |

Example 16: Sheet Extrusion Applications Using Fused Lignin Pellets

PVC/lignin blends S1 and S2 were prepared by blending BioChoice® lignin powder with PVC by melt compounding to yield blends having a lignin content of 10 and 20 wt. % respectively. These blends were used for sheet extrusion using a David Standard sheet extruder. A fused lignin pellet (Sample ID 44) was mixed with PVC to yield mixtures having a lignin content of 10 and 20 wt. % respectively (S3 and S4). Mixtures S3 and S4 were then dry-blended and sheet extruded as for S1 and S2 but without melt compounding. The temperature was set at 180-190° C. A PVC sheet (S-PVC) was also prepared under identical conditions for comparison purposes. The tensile properties of these sheets in the machine direction were subsequently determined (Table 15).

The results indicate that the PVC/lignin sheets have greater strength and modulus but a significantly lower elongation at break. Sheets prepared by melt compounding (S1 and S2) have extremely low elongation at break values. However, sheets prepared without melt compounding (S3 and S4) exhibit better elongation at break values. This indicates that it is indeed possible to eliminate the melt compounding step when using the fused lignin pellets of the present disclosure for sheet applications (reducing processing costs). Similar observations were made for PP/lignin and PLA/lignin sheet extrusion.

TABLE 15

| Tensile properties of the PVC/lignin sheet samples. | | | | | |
|---|---|---|---|---|---|
| Sheet Sample ID | Fused Lignin Pellet ID | Lignin Content (%) | Maximum Strength (MPa) | Young Modulus (MPa) | Elongation at Break (%) |
| S-PVC | | 0 | 41.2 (0.8) | 2854 (53) | 137 (71) |
| S1 | (Com- pounding) | 10 | 56.1 (1.6) | 3999 (69) | 3 (0) |
| S2 | (Com- pounding) | 20 | 49.8 (2.2) | 3507 (101) | 2 (0) |
| S3 | 44 (No compounding) | 10 | 51.9 (0.6) | 3953 (168) | 82 (24) |
| S4 | 44 (No compounding) | 20 | 59.3 (4.2) | 4328 (158) | 16 (4) |

Example 17: Thermoforming Applications Using Fused Lignin Pellets

Figure 12:
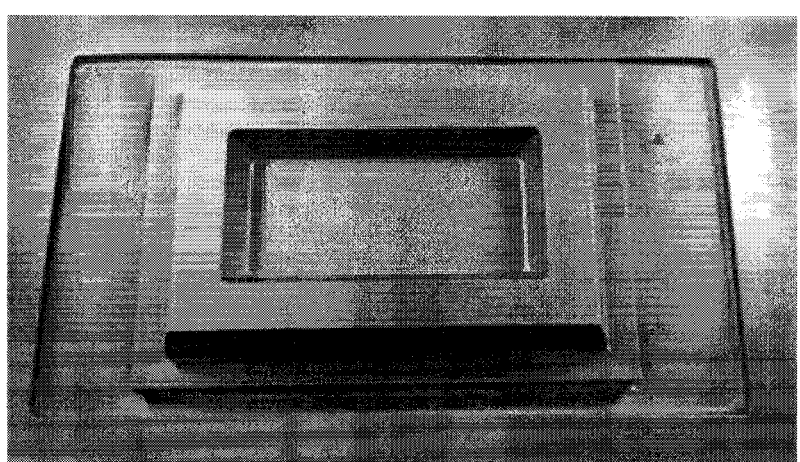
FIG. 12 is a photo of a thermoformed tray made of a PLA/lignin blend and manufactured in accordance with an embodiment of the present disclosure.

Fused lignin pellet (Sample ID 44) was dry-blended with PLA and then sheet extruded using a David Standard sheet extruder without melt compounding (as per example 16). The sheets had a thickness of 500 µm. The obtained sheets were then thermoformed at a temperature of 10-20° C. lower than the thermoforming temperature for PLA with a significant reduction of cycle time. In one specific experiment the heating time can be as low as 5 seconds. A beautiful thermoformed tray with very sharp edges was obtained (FIG. 12).

Example 18: Effect of Plasticizer on the Glass Transition Temperature (Tg) of Fused Lignin The glass transition temperature (Tg) for BioChoice® lignin powder (2% moisture content) and for fused lignin materials comprising varying contents of glycerol and poly(ethylene glycol) was determined by differential scanning calorimetry (DSC). The glycerol and poly(ethylene glycol) content has an effect on the Tg of the fused lignin materials (Table 16).

TABLE 16

| Glass Transition Temperatures of Fused Lignin Materials. | | | |
|---|---|---|---|
| Sample | Lignin Content (wt. %) | Glycerol Content | PEG400 Content | Tg (° C.) |
| 1 | 100 | | | 131 |
| 2 | 95 | 5 | | 105 |
| 3 | 90 | 10 | | 85 |
| 4 | 90 | | 10 | 71 |

While the present disclosure has been described with reference to specific examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

The invention claimed is:

1. A fused lignin pellet consisting essentially of raw lignin and a plasticizer, wherein the fused lignin comprises a substantially single phase morphology.

2. The fused lignin pellet of claim 1, wherein the pellet comprises a moisture content of less than about 5%.

3. The fused lignin pellet of claim 1, wherein the pellet comprises a moisture content of less than about 2%.

4. The fused lignin pellet of claim 1, wherein the pellet is an extruded lignin pellet.

5. The fused lignin pellet of claim 1, wherein the pellet is a non-porous pellet.

6. The fused lignin pellet of claim 1, wherein the pellet is a porous pellet.

7. The fused lignin pellet of claim 1, wherein the pellet comprises a VOC content of less than about 0.1 wt. %.

8. The fused lignin pellet of claim 1, wherein the plasticizer is at least one of glycol, glycerol, crude glycerol, epoxidized soybean oil, poly(ethylene glycol) and poly(propylene glycol); and wherein the pellet comprises from 1 wt. % to 20 wt. % of the plasticizer.

9. A process for producing a fused lignin pellet consisting essentially of raw lignin and a plasticizer, the process comprising:

feeding a lignin feed material consisting essentially of raw lignin into an extruder;

adding a plasticizer to the lignin feed material at one or more downstream sections of the extruder to produce a mixture; and devolatizing moisture and volatile organic content from the lignin feed material in the mixture;

wherein the fused lignin comprises a substantially single phase morphology.

10. The process of claim 9, wherein the fused lignin pellet comprises a VOC that has been reduced by at least about 40% relative to the VOC in the lignin feed material.

11. A fused lignin pellet consisting essentially of raw lignin and a lubricant, wherein the fused lignin comprises a substantially single phase morphology.

12. The fused lignin pellet of claim 11, wherein the pellet comprises a moisture content of less than about 5%.

* * * * *